US011857984B2

(12) United States Patent
Van Rijn et al.

(10) Patent No.: US 11,857,984 B2
(45) Date of Patent: Jan. 2, 2024

(54) SPRAY DEVICE AND SPRAY NOZZLE BODY

(71) Applicant: MEDSPRAY BV, Enschede (NL)

(72) Inventors: Cornelis Johannes Maria Van Rijn, Amsterdam (NL); Wietze Nijdam, Enschede (NL); Jacob Baggerman, Wageningen (NL); Henri Joseph Van Egmond, Enschede (NL)

(73) Assignee: MEDSPRAY BV, Enschede (NL)

( * ) Notice: Subject to any disclaimer, the term of this patent is extended or adjusted under 35 U.S.C. 154(b) by 198 days.

(21) Appl. No.: 15/781,401

(22) PCT Filed: Dec. 5, 2016

(86) PCT No.: PCT/NL2016/050845

§ 371 (c)(1),
(2) Date: Jun. 4, 2018

(87) PCT Pub. No.: WO2017/095227

PCT Pub. Date: Jun. 8, 2017

(65) Prior Publication Data

US 2018/0353980 A1 Dec. 13, 2018

Related U.S. Application Data

(63) Continuation-in-part of application No. PCT/NL2016/050635, filed on Sep. 14, 2016.

(Continued)

(51) Int. Cl.
*B05B 1/26* (2006.01)
*A62C 31/05* (2006.01)

(Continued)

(52) U.S. Cl.
CPC .............. *B05B 1/267* (2013.01); *A62C 31/05* (2013.01); *A62C 37/11* (2013.01); *B05B 1/14* (2013.01);

(Continued)

(58) Field of Classification Search
CPC .. B05B 1/267; B05B 1/14; B05B 1/26; B05B 1/1618; B05B 15/40; A62C 31/05; A62C 37/11
See application file for complete search history.

(56) References Cited

U.S. PATENT DOCUMENTS 6,732,943 B2 * 5/2004 Srinivasan ........ A61M 15/0028 128/200.14
7,748,647 B2 * 7/2010 Clerget ................ B65D 83/753 239/337

(Continued)

FOREIGN PATENT DOCUMENTS

CN 1237119 A * 12/1999 ............... B05B 1/02
CN 1237119 A 12/1999

(Continued)

OTHER PUBLICATIONS

IPRP, Written Opinion and International Search Report corresponding to International Patent Application Serial No. PCT/NL2016/050845 dated Jun. 5, 2018.

(Continued)

*Primary Examiner* — Qingzhang Zhou
(74) *Attorney, Agent, or Firm* — Jenkins, Taylor, & Hunt P.A.

(57) ABSTRACT

The present invention relates to a spray of microjets emanating at an inclined angle from nozzles comprised in a substantially planar membrane layer. A spray nozzle unit for spraying a plurality of fluidic microjets from a pressurized liquid comprises a substantially planar (semiconductor) support having an upstream surface and a downstream surface, and a spray membrane layer arranged on the downstream surface of the support. The spray membrane layer comprises a plurality of nozzle orifices each configured for spraying a fluidic microjet in a Rayleigh regime. Thee support defines a cavity extending from the upstream surface to the spray (Continued)

membrane layer. The cavity is in fluid communication with each one of the nozzle orifices for supplying the pressurized liquid to the nozzle orifices. A position of the nozzle orifices, seen along a direction perpendicular to the downstream surface, is offset in respect of a centre of the cavity. At least two of the nozzle orifices exhibit a different offset in respect of the centre of the cavity.

60 Claims, 10 Drawing Sheets

Related U.S. Application Data

(60) Provisional application No. 62/262,972, filed on Dec. 4, 2015.

(51) Int. Cl.

| | |
|---|---|
| ***B05B 1/14*** | (2006.01) |
| ***A62C 37/11*** | (2006.01) |
| *B05B 15/40* | (2018.01) |
| *B05B 1/16* | (2006.01) |

(52) U.S. Cl.

CPC .............. *B05B 1/26* (2013.01); *B05B 1/1618* (2013.01); *B05B 15/40* (2018.02)

(56) References Cited

U.S. PATENT DOCUMENTS

| | | | | |
|---|---|---|---|---|
| 8,616,417 | B2 * | 12/2013 | Neuhaus | B65D 83/206 222/402.13 |
| 2006/0213408 | A1 * | 9/2006 | Christ | B05B 11/3022 111/200 |
| 2007/0018013 | A1 * | 1/2007 | Lasebnick | B60S 1/52 264/318 |
| 2008/0006719 | A1 | 1/2008 | Clerget et al. | |
| 2014/0231540 | A1 * | 8/2014 | Greiner-Perth | B05B 1/185 239/102.2 |

FOREIGN PATENT DOCUMENTS

| | | | |
|---|---|---|---|
| CN | 101104463 | A | 1/2008 |
| EP | 2172239 | A2 | 4/2010 |
| GB | 2466631 | | 7/2010 |
| JP | 11-267555 | A | 10/1999 |
| JP | 2011-76871 | A | 4/2011 |
| JP | 2012-166189 | A | 9/2012 |
| KR | 10-2011-0093159 | A | 8/2011 |
| WO | WO 2001/02098 | A1 | 1/2001 |
| WO | WO 2009/150458 | A1 | 12/2009 |

OTHER PUBLICATIONS

IPRP, Written Opinion and International Search Report corresponding to International Patent Application Serial No. PCT/NL2016/050635 dated Jun. 5, 2018.

van Rijn et al., Deflection and maximum load of micro-filtration membrane sieves made with silicon micro machining, Journal of MEMS, vol. 6, No. 1, pp. 48-54 (Mar. 1997).

Office Action corresponding to Chinese Patent application No. 201680071119.5 dated May 15, 2020 (English Translation).

Office Action (Notice of Reasons for Refusal) corresponding to Japanese Patent application No. 2018-528743 dated Oct. 28, 2020 (English Translation).

* cited by examiner

SPRAY DEVICE AND SPRAY NOZZLE BODY

CROSS REFERENCE TO RELATED APPLICATIONS

This application claims benefit of PCT International Patent Application Serial No. PCT/NL2016/050845, filed Dec. 5, 2016, incorporated herein by reference in its entirety, which claims benefit of: (1) PCT International Patent Application Serial No. PCT/NL2016/050635, filed Sep. 14, 2016, incorporated herein by reference in its entirety; and (2) U.S. provisional application Ser. No. 62/262,972, filed Dec. 4, 2015, incorporated herein by reference in its entirety. PCT International Patent Application Serial No. PCT/NL2016/050635, filed Sep. 14, 2016, also claims benefit of U.S. provisional application Ser. No. 62/262,972, filed Dec. 4, 2015.

The present invention relates to a spray device, for spraying a fluidic microjet spray, comprising a spray nozzle unit, said spray nozzle unit comprising at least one spray nozzle having a chamber for receiving a pressurized fluid therein and having a perforated nozzle wall for releasing a microjet spray of said fluid.

A microjet is here defined as a single or a multiple number of jets operating in the Rayleigh breakup regime. As a result, consecutive droplets may have a same size and propagate from the nozzle orifice in a same direction. Often corresponding nozzle orifices are provided in a planar substrate and the generated microjets will form parallel, mono directional droplet trains, all directed in a same spraying direction. When spray nozzle units are further miniaturized the distance between nozzle orifices will become smaller and microjets propagating in a parallel fashion may easily exhibit disordered trajectories due to induced air streams, leading to undesirable coalescence and a broadened droplet size distribution. Complex mechanisms such as charging, ultrasound and heating may be used to manipulate and deflect individual liquid jets. Also a forced co-flow of air via additional nozzle(s) has been proposed to prevent coalescence of parallel liquid jets.

A spray device of the type as described in the opening paragraph is for instance known from U.S. patent application 2008/0006719. This patent application describes, particularly with reference to FIG. 7 of its drawing, a spray nozzle body with a support body and front wall that are formed as a single piece of plastic material. The front wall of this known device is relatively thin to be elastically deformable and to adopt an overall curved profile once exposed to the pressure of said pressurized fluid. As a consequence, the fluidic micro-jet generated with this known device will be released along a centre line of the respective orifice that is directed away from an imaginary normal line to the surface of said front wall in its non-pressurized state. Together several of these microjets will create a spray cone of individual jets with a certain angle of deflection that varies from the centre of said front wall and increases towards its edge.

For specific applications such as cosmetics, perfume, wafer cleaning, fuel injection, spray dryers, medical sprays, characteristic spray patterns are required and adequate control of the spray cone and spray inclination angle is required. For pharmaceutical applications, for instance, a spray providing small droplets with a narrow size distribution can be efficiently targeted at different sections of the lungs, provided that the micro-jet spray can be adequately controlled and reproduced among different spray devices. Particularly measures to prevent coalescence of individual droplets and widening of the droplet size distribution are of importance especially in these special spray devices.

The spray device that is known from the afore mentioned US patent application will unable to deliver the degree of precision and reproducibility that is often required for these more sophisticated spray devices. Particularly the angle of deflection of each microjet that is released by the known device will be dependent on the applied fluidic pressure to a significant extent which is unpractical for certain applications.

The present invention has for its object, inter alia, to provide a spray device that generates a fluidic micro-jet spray and that allows and retains a relatively narrow droplet size distribution of microjet; and droplets obtained via a Rayleigh breakup mechanism under a well defined angle of deflection.

To that end a spray device of the type as described in the opening paragraph is, according to the invention, characterized in that said spray nozzle is formed by a nozzle body, comprising a support body with at least one cavity that opens at a main surface of said support body, said support body being covered by a membrane layer at said main surface and said membrane layer being provided with at least one nozzle orifice throughout a thickness of said membrane layer at an area of said cavity to form a nozzle membrane at each of said at least one cavity that is in fluid communication with the respective cavity, in that said at least one nozzle orifice comprises at least one deflecting nozzle orifice, releasing said microjet under a deflected angle that is directed away from a centre line of said orifice, and in that said at least one deflecting nozzle orifice is in open communication with a fluidic flow channel that has a lateral asymmetrical flow-profile in terms of a fluid flow resistance from said cavity towards said nozzle orifice.

Said fluidic flow channel enabling a lateral asymmetrical flowprofile in terms of a fluid flow resistance from said cavity towards said nozzle orifice can be effectively combined with an active or passive micro-valve stream upwards of said deflecting orifice. For this the spray device is characterized in that micro-valve means are present upstream of said defelcting nozzle orifice, said valve means comprising a micro-valve disc in close proximity of a micro-valve seat, said micro-valve disc resting on said micro-valve seat in a normally closed state and lifting from said seat once an upstream pressure threshold is exceeded to open a fluid passage between said micro-valve disc and said micro-valve seat towards said fluidic flow channel. Thus the fluidic flow channel opens when pressurized (beyond said threshold) but without pressure it is in a closed state, and effectively said closed passage provides a microbiological barrier. In a specific embodiment this combination of a deflecting nozzle orifice and such valve means, that only open said fluidic flow channel when pressurized, can be used to produce colliding jets.

The nozzle body of the spray device according to the invention is formed by a support body, particularly by a semiconductor support body that is at least partly made of semiconductor material and materials that are compatible with nowadays semiconductor manufacturing technology. As a consequence, such extremely accurate and reproducible semiconductor manufacturing technology and micro-machining steps may be used to manufacture and configure the nozzle body. Not only a precise form, size and position of the individual membranes and nozzle orifices may be thus very well controlled, also the form and local dimensions of the flow channel towards these orifices can be tailored to provide a desired flowprofile.

By creating and offering a flow profile that is asymmetrical in terms of fluid flow resistance from a cavity towards an orifice, a lateral net impulse will be imposed on the emanating jet that gives a certain angle of deflection depending on the degree of asymmetry that was built in said flow channel. As a consequence, not only the droplet size and droplet size distribution but also the spray (cone) profile may be delicately controlled and tailored by using a device in accordance with the invention. This renders this device particularly suitable for sophisticated applications that require a high degree of control over the emanating microjet spray.

The spray nozzle particularly comprises a substantially planar support body, such as a semiconductor substrate and a spray membrane layer arranged on a downstream surface of said support body, i.e. at an outlet side of the support. The spray membrane layer may be formed by a layer on the substrate, such as silicon nitride. A cavity is provided in the support body, particularly extending from an upstream surface of the support body to said spray membrane layer, so as to allow pressurized liquid to be supplied from an upstream side and to reach the membrane layer via said cavity. The membrane layer forms a membrane, comprising one or more orifices, that is suspended over a downstream face of said cavity. Said upstream surface of the support body is to be understood as a surface of the support body that is a supply side of the pressurized liquid. The downstream surface of the support is to be understood as a surface of the support is the spray discharging side. The membrane layer is particularly provided with a plurality of nozzle orifices, each configured to operate in the Rayleigh domain which may generally imply a nozzle orifice diameter in a range of between 1 and 25 micrometer or less.

For some applications a high throughput of spray liquid is required. A high dose of spraying can be achieved by choosing the flow resistance of each nozzle orifice as small as possible and/or by increasing the pressure difference over the orifices during spraying. Practically required pressures are chosen to be fairly higher than typical between 5 and 10 bar. Such pressure will exert high forces on the nozzle membrane that is suspended over a cavity. The membrane layer and, hence, the nozzle membrane that is suspended over the cavity, may therefore be chosen fairly thick in order to withstand such high pressure. However, a thick nozzle membrane implies a long orifice length and, consequently, a high flow resistance and a reduced flow rate. Downscaling the lateral size of the nozzle membrane that is suspended over the cavity may be another measure to withstand a high spray pressure. The disadvantage, however, is that in that case the same number of nozzle orifices will be more densely packed, leading to enhanced risk of coalescence of the microjets emanating from the nozzle orifices.

Surprisingly is has been found that a thin and small nozzle membrane according to the invention not only enables a high spray flow rate but also forces the deflecting microjets to a certain spray angle with respect to the membrane layer. These diverging spray jets, emanating from a single thin and small nozzle membrane with multiple orifices, to a large extent advantageously prevent a coalescence of the spray droplets. Surprisingly it has been found that the spray angle or spray cone deviates most with nozzle orifices placed at the boundary of the nozzle membrane close to the boundary of the cavity where the nozzle membrane is tight to the support body. Preferably, the membrane layer is relatively thin compared to the diameter of the orifice as, typically, the angle of deflection decreases considerably with increasing orifice length which is the thickness of the membrane layer.

As can be seen in FIG. 27, the deflection angle is strongly dependent on the thickness of the membrane and decreases considerably when the depth of the orifice becomes less than 50%, i.e. less than about 2.25 μm, and more particular becomes particularly predominant if the thickness of the membrane is less than 25%, less than 1.12 μm, of the orifice diameter, said diameter being 4.5 μm in case of FIG. 27.

It has been found that by modifying and tailoring the flow profile of the liquid beneath the nozzle membrane in terms of fluid flow resistance from the underlying cavity to an orifice, strongly diverging sprays may be obtained. A particular embodiment of the spray device according to the invention is, hence, characterized in that said cavity is configured to impose a lateral impulse on said fluid in said fluidic flow channel that is conveyed to the liquid while forming the microjet.

It is a primary object of the invention to control the spray angle or jet inclination angle. To that end a particular embodiment of the spray device according to the invention is characterized in that said nozzle membrane comprises a central region at the area of said cavity and a peripheral region between said central region and an edge of said cavity, and in that at least one deflecting nozzle orifice is located within said peripheral region, and more particularly in that at least one deflecting nozzle orifice is positioned near a peripheral wall of said cavity, in particular at a distance between a center of said deflecting nozzle orifice and said peripheral wall that is less than three times a diameter of said nozzle orifice, and preferably less than said diameter of said nozzle orifice.

Surprisingly it has been found that if the nozzle orifice is positioned close to the periphery, i.e. the edge wall, of the cavity the generated microjet is emitted at an inclined angle with respect to the centerline of the orifice and, hence, to the substantially planar membrane layer. The closer the orifice is positioned near the edge wall of the cavity of the support body, the more oblique this angle of inclination will be.

This behaviour is believed to be caused in that the cavity and said nozzle orifice form somehow a geometrically asymmetric fluid flow resistance. This creates a lateral impulse of the liquid beneath the nozzle membrane that is subsequently conveyed to the liquid forming the microjet. In this respect the expression "lateral" is meant to be parallel to the substantially planar membrane layer, i.e. parallel to the downstream surface of the support. When the fluid is flowing parallel to the nozzle membrane just before it is exited via the nozzle orifice, it will have a specific lateral impulse (mass density times horizontal velocity) and it will keep this lateral impulse at least to a certain extent upon flowing through the nozzle orifice. When the fluid passes the nozzle it will also acquire a vertical impulse (mass density times vertical velocity) with respect to the membrane layer.

Provided that the membrane layer is relatively thin, a significant part of the lateral impulse will be transferred to the jet emanating from the nozzle, causing the jet to deflect away from the centerline of the orifice. The jet inclination angle will be determined by the ratio between the transferred lateral impulse and the vertical impulse of the fluid. Typically and preferably this ratio should be larger than 0.1 and, most preferably, is larger than 0.2. The closer the orifice is positioned near the edge of the cavity, the larger the residual lateral impulse of the microjet will be and, hence, the more oblique the angle of inclination. The above described asymmetry effect is promoted by the presence of the edge wall of the cavity near the orifice.

The lateral impulse of the jet is meant to be the average lateral impulse of the fluid near the nozzle exit and, more particularly, the lateral impulse as averaged over a virtual lateral channel with a channel height equal to the diameter of the nozzle orifice and having a boundary with the nozzle membrane, for cases in which the total height of the lateral channel is considerably larger than the diameter of the nozzle orifice.

In an embodiment, where the nozzle orifice is positioned close to the edge wall of the cavity the microjet is forced to an inclined angle with respect to the substantially planar membrane layer. This effect will particularly occur when the distance between the edge wall and the centre of the orifice is less than three times a diameter of the nozzle orifice and, particularly, less than said diameter of said orifice. The closer the orifice is positioned near the edge of the cavity of the support body the more oblique is the angle of inclination. A further particular embodiment of the spray device according to the invention is thereby characterized in that said at least one deflecting nozzle orifice has a diameter larger than 10% of a diameter of said cavity and particularly has a diameter larger than 25% of the diameter of said cavity. This embodiment delivers inclination angles larger than 5°. In particular, said nozzle orifice may have a diameter larger than 25% of the diameter of the cavity, which delivers inclination angles larger than 10°.

The inclination angle can be increased substantially (more than three degrees) in specific embodiments when the nozzle orifice has a direct boundary with said vertical edge wall, and can also be enlarged (more than four degrees) when the cavity tapers positively towards the nozzle orifice. The tapering contributes to more conveyance of the lateral impulse to the emanating jet. It will be understood that measures that increase the lateral impulse of the fluid in combination with a thin nozzle membrane will yield large inclination angles.

Very large inclination angles, particularly over 10-20 degrees, mat be obtained with a further specific embodiment of the spray device according to the invention, that is characterized in that said cavity comprises at least one relatively shallow lateral extension at said main surface, said membrane comprising at least one deflecting orifice at the area of said extension, and particularly in that said extension generally has a width between 0.3 and 3 times a diameter of said deflecting orifice and a length between 0.5 and 5 times a diameter of said orifice. In these embodiments, the fluid flow channel extends over a specific length through the confined space of such an extension beneath the nozzle membrane with a height comparable or smaller than the nozzle orifice diameter. This creates a geometrical asymmetry in the fluidic flow channel, connecting the cavity to the nozzle orifice, that imposes a lateral net impulse on the liquid that is subsequently conveyed to the microjet. This in turn, causes the microjet to deflect from the centerline of the orifice.

The latter angle of inclination may be increased by creating more geometrical asymmetry in the flow channel towards the surface. In this respect a particular embodiment of the spray device according to the invention is characterized in that said extension generally has a depth that is between 0.3 to 3 times a diameter of said orifice. A ratio between the transferred lateral impulse and the vertical impulse of the emanating jet may in that case be larger than 0.1 and preferably larger than 0.2.

The shallower this lateral extension and the smaller the orifice length; the larger the inclination angle of the emanating jet will be. Very small dimensions may be realized in a special embodiment of the spray device that is characterized in that said support body has been locally etched to form said at least one lateral extension of said cavity. For instance semiconductor technology or micro-machining in combination with a support body that allows the use of such techniques enable a lateral extension of the cavity to be created with a great amount of precision and detail.

As such a first special embodiment of the spray device according to the invention is characterized in that said a least one lateral extension of said cavity comprises a substantially ring-shaped extension along a periphery of said cavity in fluid communication with a plurality of angularly distributed deflecting nozzle orifices. A further special embodiment has as its feature that said a least one lateral extension of said cavity comprises a plurality of angularly distributed local extensions of said cavity, each being in fluid communication with at least one deflecting nozzle orifice.

The flow profile of the fluid flowing from the cavity towards the orifice may be given an asymmetric flow resistance pattern, not only by providing a local restriction, like the a shallow extension of the cavity, but also by providing a local obstruction within the flow channel. In this respect a further special embodiment of the spray device according to the invention is characterized by comprising at least one fluid barrier near said at least one deflecting orifice that is at least partly positioned in said fluidic flow channel towards said nozzle orifice, said at least one barrier being provided asymmetrically with respect to said nozzle orifice, and more particularly in that said barrier comprises at least one rim or protrusion that extends from said membrane to inside said flow channel.

This barrier creates resistance and, because it is provided asymmetrically with respect to the subject nozzle orifice, will lead to more resistance at the side where it is positioned relative to a side of the orifice that may be reached by the fluid without a (similar) obstruction or barrier. As a result, a high net lateral impulse will be conveyed to the emanating jet. Specifically the spray device, in this respect, is characterized in that said at least barrier is provide along a linear, multi-linear or curvilinear contour around said deflecting nozzle, said contour being open at a side of said orifice that is directed to a centre of said cavity. The resulting deflection of the microjet proved most eminent in a special case where said at least one barrier leaves a gap for fluidic passage of between 50 nanometre and 5 micrometre.

Particularly satisfactory results have been obtained with a semi-circular barrier placed closely around a circular nozzle orifice with a preferred barrier height 0.1-1 times the diameter of the orifice. Small barrier heights such as 0.1-0.3 times the diameter of the orifice are easy to implement in the manufacturing process, whereas barrier heights are most effective when they have a height comparable with the orifice diameter. A semi-circular barrier placed closely around the orifice proved particularly effective; even twice effective as for instance a straight wall barrier.

Besides or additional to imparting a certain amount of asymmetry in the flow channel beneath the membrane, also the membrane itself may impose a lateral asymmetry on the lateral flow resistance of the fluid. To this end a further particular embodiment of the spray device according to the invention is characterized in that said at least one deflecting orifice has a non-axi symmetrical shape having a wider part and a narrower part, particularly an oval, tear, moon, V or U shape, and in that said wider part of said nozzle orifice faces away from an edge wall of said cavity. Due to its particular shape, the nozzle orifice creates a geometrically asymmetric fluid flow resistance inside the spray membrane layer itself. As a result, a flow resistance at one side of the orifice is larger than the flow resistance at the other side, causing the microjet from the nozzle to be emitted at an angle.

It has been found that the liquid through a part of the nozzle orifice facing an edge of the cavity may, as a result, have a velocity that is at least ten percent lower than the velocity of the liquid through a part of the nozzle orifice facing away from the edge wall. This forces the exiting microjet to an inclined angle with respect to the centerline of the orifice and, hence, to the membrane layer. Due to their asymmetrical shape, several of such nozzles will emit microjets divergent in respect of each other.

In a further specific embodiment, spray device according to the invention is characterized in that said cavity has a generally circular or polygonal cross-section at said main surface and in that said at least one deflecting nozzle orifice comprises a set of a number of deflecting nozzle orifices that are angularly distributed along at least a part of a peripheral edge of said cavity, in particular at a distance from said edge that is less than a diameter of an orifice. As elucidated hereinbefore, each nozzle will emit the microjet at an inclined angle with respect to the main surface. The arrangement of several of these nozzles in a spaced relationship along the periphery of the cavity results in a divergent spray pattern of the emanating microjets during operation. In this respect a further particular embodiment of the spray device according to the invention is characterized in that at least one further set of deflecting spray nozzle orifices is angularly distributed along at least a part of said peripheral edge of said cavity, particularly at a distance from said edge that is between one and three times said diameter of an orifice. Thereby, an inner ring of nozzles is formed that emit at an angle of inclination that is smaller than the nozzles of the first, outer ring, as they are spaced further away from the cavity edge. This contributes further to a divergent spray pattern.

One symmetrically shaped orifice may be present in the center of the cavity, causing a center jet stream of droplets to be ejected perpendicular to the downstream surface, i.e. without inclination.

In a further particular embodiment the spray device according to the invention is characterized in that said nozzle membrane is configured to bend during operation from a substantially flat initial state to an at least partly curved profile under pressure while releasing said microjet spray, and in that said at least one nozzle orifice is located near a point of inflection in said curved profile of said nozzle membrane. Such a convex bending of a flat nozzle membrane due to art applied pressure will also contribute to a divergence of the spray jets. In practice this can be an added measure of the embodiments to enlarge the angle of deflection of the microjets even further.

In case of a rigid, relatively brittle membrane, like for instance a ceramic membrane, a preferred embodiment of the spray device according to the invention in this respect is characterized in that said nozzle membrane is configured to bend in that said membrane is corrugated, comprising at least one corrugation along a periphery of said cavity. It has been found that the presence of corrugated zones in the suspended membrane allows even a rigid, relatively brittle membrane to bent. This may contribute to an enlarged divergence of the jets, especially if the nozzle orifices are placed close to the edge wall of the cavity in the membrane layer support body. A further specific embodiment of the spray device according to the invention is, hence, characterized in that said membrane comprises at least two laterally spaced corrugations along the periphery of said cavity and in that said at least one deflecting orifice is positioned in between adjacent corrugations.

Also a local bending of the peripheral wall of the nozzle orifice itself may contribute to a deflection of the emanating microjet. In this respect a further special embodiment of the spray device according to the invention is characterized in that said nozzle membrane is configured to bend in that said membrane is provided with at least one deflecting nozzle orifice that is elongated and allows said membrane to deflect along an edge of said elongated nozzle orifice.

In order to reduce the risk of rupture in case of bending of a relatively rigid, brittle nozzle membrane, like for instance a ceramic, particularly silicon nitride membrane, the applied pressure should be well below the maximum allowed pressure. Appropriate guidance can be found, in this respect, in Journal of MEMS, C. J. M. van Rijn et al., Deflection and maximum load of micro-filtration membrane sieves made with silicon micro machining, page 48-54 (1997), which is hereby incorporated by reference.

The (average) angle of inclination scales with the cubic root of the applied pressure and that the maximum angle of inclination of the nozzle membrane is at the point of inflection. Because the point of inflection moves toward the edge of the nozzle membrane when increasing the applied pressure, the nozzle membrane is preferably constructed such that the nozzle orifices are located at the point of inflection when applying the preferred spray pressure. The operating window for doing this is quite large because the average angle of inclination itself scales with only the cubic root of the applied pressure. Circular membranes, i.e. membranes over a cavity having a circular cross section at the main surface, are strongest clue to absence of stress concentrations.

A specifically peculiar embodiment of the spray device according to the invention is characterized in that said deflecting orifice extends partly beyond an edge of said cavity and partly over said cavity. In this case, part of the fluid may reach the orifice straight up from the cavity, while another part is forced between the membrane and the support body. The microjet, hence, leaves partly after fluid contact with the nozzle membrane but also partly without substantial contact with the nozzle membrane. Effectively this configuration forms a nozzle with an aperture that is inclined to the membrane layer.

The angle of inclination is strongly determined by the size of the orifice, the thickness of the membrane layer, and the depth of the lateral fluidic channel beyond the cavity in the support body. This lateral fluidic channel can be obtained by locally etching a sacrificial layer or the support body beneath said nozzle orifice to a depth between 0.3 to 3 times the mean diameter of the orifice. For a more controlled precision of the depth of etching, a sacrificial layer with a specific thickness can be used between the support body and the membrane layer, e.g. a layer of silicon oxide layer with a thickness comparable to an average diameter of the orifice emitting the microjet.

In a further embodiment, the spray device is characterized in that a bare surface of said spray nozzle is hydrophobic at least at an area adjacent said at least one nozzle orifice. As a result, any residue of the liquid will tend to be repelled, which may enhance self cleaning properties of the orifice.

A further special embodiment of the spray device according to the invention is characterized in that said support body comprises a plurality of cavities that are distributed at said main surface, particularly distributed angularly at said surface, each one of said cavities being spanned by a nozzle membrane having at least one deflecting nozzle orifice. Each cavity is provided with at least one nozzle orifice. The offsets of the respective orifices with respect to the centre of the corresponding cavities may tend to exhibit an centrifugal pattern as seen in respect of a centre of the angularly arranged cavities, causing a divergent spray bundle.

In a further embodiment, the spray device according to the invention is characterized in that said cavity is generally ring-shaped, and in that said at least one deflecting nozzle orifice comprises groups of orifices that are distributed along an outer periphery of said generally ring-shaped cavity. Also such a angular distribution of the groups of orifices results in a divergent spray bundle in accordance with the mechanism as described above.

The deflection of the micro-jet that may be achieved by the spray device according to the invention opens a door to a unique class of devices. To that end a further preferred embodiment of the spray device according to the invention is characterized in that said membrane comprises at least two deflecting nozzle orifices, releasing said microjet under a deflected angle along a jet line that is directed away from an imaginary centre line of the respective orifice, and in that the jet lines of said at least two nozzle orifices intersect one another to cause said emanating microjets to collide during operation. At the spot of intersection the two jets, emanating from these orifices, will impinge on one another, which causes the droplets to break up into smaller droplets. Larger orifices are, hence, allowable for creating these smaller droplets which allows liquids to be used for spraying that would normally not be sprayable, at least not in the Rayleigh domain. This is for instance the case with liquids having a relatively high viscosity. Larger orifice diameters allows for a lower working pressure. Also emulsions and nano-suspensions may be sprayed without substantial destabilisation with these larger pore sizes that are, moreover, less prone to obstruction.

A further preferred embodiment of the spray device according to the invention is characterized in that said membrane comprises at least two deflecting nozzle orifices, releasing said microjet under a deflected angle along a jet line that is directed away from an imaginary centre line of the respective orifice, and in that said at least two nozzle orifices have a mutually different lateral cross section. The angle of deflection appears to be dependent i.a. on the size and shape of the cross-section of the orifice concerned and may be tailored individually in this manner for said at least two orifices.

This feature may advantageously be used for generating sprays for instance for fragances and other cosmetics that need to give a pleasant sensation. A further embodiment in this respect of the spray device according to the invention is characterized in that said membrane comprises at least two groups of deflecting nozzle orifices, releasing said microjet under a common deflected angle along a jet line that is directed away from an imaginary centre line of the respective orifice, and in that the orifices within each of said at least two groups of nozzle orifices feature a substantially identical lateral cross section that is distinct from a lateral cross section of the orifices in the other of said at least two groups of deflecting nozzle orifices. Such variation in orifice diameter or shape may be used to attain a comfortable, uniform sensation of the spray jets for instance for cosmetic applications, like fragrances. Especially for jets in a cone spray with varying jet angles, the distance for the outer jets (with largest deflection) to travel before they hit the skin is longer than the inner jets. A longer jet has more coalescence than the inner jets resulting in larger droplets. By defining the jet diameter (by changing the orifice diameter and/or size) of the outer jets smaller than the inner jets, it is possible to compensate for this coalescence and to obtain a more uniform droplet size and sensation at the skin.

Depending on the specific configuration of nozzles the outer jets may have another coalescence behaviour than the inner jets, resulting in broadening of the droplet size distribution. By changing the orifice diameter of the outer jets with respect to the orifice diameter of the inner jets, it is possible to compensate for this coalescence effect and to maintain more mono-dispersity, in particular a spray providing small droplets with a narrow size distribution can be efficiently targeted at different sections of the lungs, e.g. in vaporizers.

Moreover, a droplet reaching the skin under an angle may have less impact than a droplet reaching the skin vertical. To, nevertheless, obtain a more uniform skin sensation, the (groups of) orifices may be dimensioned and shaped such that the droplets emanating from inner jets will be smaller than the droplet emanating from the outer jets. This compensates at least to a certain degree for the difference, in impact due to a different angle of impact. Further is would be possible to increase the total flow rate of these outer jets, in an effort to improve the skin sensation, as the amount of jets on an outer ring can be higher than the amount of jets on the inner ring.

If the nozzle contains jets with different orifice sizes, the nozzle may suffer from of drooling before all jets are spraying. This is because small pore sizes require higher pressure to start than large pore sizes. In order to create a large jet, while still having a uniform start of the nozzle, a special embodiment of the spray device according to the invention is characterized in that these relatively small orifices are placed next to orifices that have a larger, nominal size, more particularly in that these small orifices have a pore size at least three times smaller than the orifices that have a larger, nominal size. In this situation the smaller orifices may still drool, but the drooling will be picked up by an adjacent jet emanating from such a larger orifice and merely increase the diameter of this jet.

A particularly preferred embodiment of the spray device according to the invention is characterized in that at least one of said deflecting orifices has a triangular lateral cross-section. Surprisingly, it turns out that a triangular shape to an orifice provides a more stable and greater jet deflection compared to circular orifice of a same size. Also in the area around an orifice the membrane layer may be made thinner locally. It appears that this will give a larger jet deflection by several degrees. This is especially beneficial for smaller orifices, typically with a diameter of less than 3 micron. With a in-plane geometry it is thus possible to obtain a jet deflection by more than 45 degrees and even more than 50 degrees which is of great benefit in an embodiment in which two or more jets are to collide.

In an embodiment, said spray nozzle is provided with filtration means which comprise a filtration plate that is in fluid communication with said cavity and that is provided onto an upstream surface of said support body. This pre-filter prevents particles, such as contamination in the fluid, from reaching the nozzle and, hence, prevents a clogging of the nozzle (orifices).

In an embodiment, said support body comprises a semiconductor body, preferably a silicon body. In a further embodiment said membrane layer comprises a ceramic layer, particularly of a thickness that is generally less than 2 microns, more particularly a silicon nitride layer. These materials are compatible with conventional semiconductor and micro-machining techniques that allow an extremely high precision and degree of freedom of the features and details that are thereby created in the device. In a further embodiment, said nozzle orifice has a diameter between 0.4 and 10 micron, allowing to operate in the Rayleigh domain.

In a further specific embodiment, the spray device according to the invention is characterized in that air diffusor means are provided downstream of said nozzle, said air diffusor means being configured to reduce a velocity of the fluidic microjet that emanates from said nozzle, wherein said air diffusor means are conically or trumpet shaped and comprise at least one air inlet opening. The diffusor means provide turbulent air streams which spread the droplets of the microjets over a larger area, hence further preventing clogging of the droplets and distributing the droplets over a larger area.

According to a further aspect of the invention, there is provided a spray device for spraying a liquid, the spray device comprising a spray nozzle unit according to the invention and a liquid supply system for supplying pressurized liquid, the liquid supply system being in fluid communication with the cavity of the spray nozzle unit for supplying, pressurized liquid to the spray nozzle. The liquid supply system may comprise a pump, a pressurized container, or any other suitable liquid propagation device.

In an embodiment, the liquid is a cosmetic liquid or a wafer cleaning liquid, and the spray nozzle has a microjet divergence angle larger than 10°. The cosmetic liquid may for example comprise a perfume, a facial moisturizer, a body spray, deodorant or a fabric cleaner. Wafer cleaning liquids are generally used for cleaning semiconductor wafers in semiconductor technology.

The invention further relates to a spray nozzle body of the type as applied in the spray device according to the invention and will be further elucidated with reference to a number of examples and an accompanying drawing.

Figure 1:
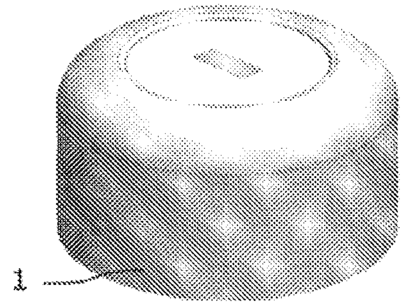
FIG. 1 is a perspective view of a spray nozzle unit according to the invention carrying a spray nozzle body in its centre.
Figure 2:
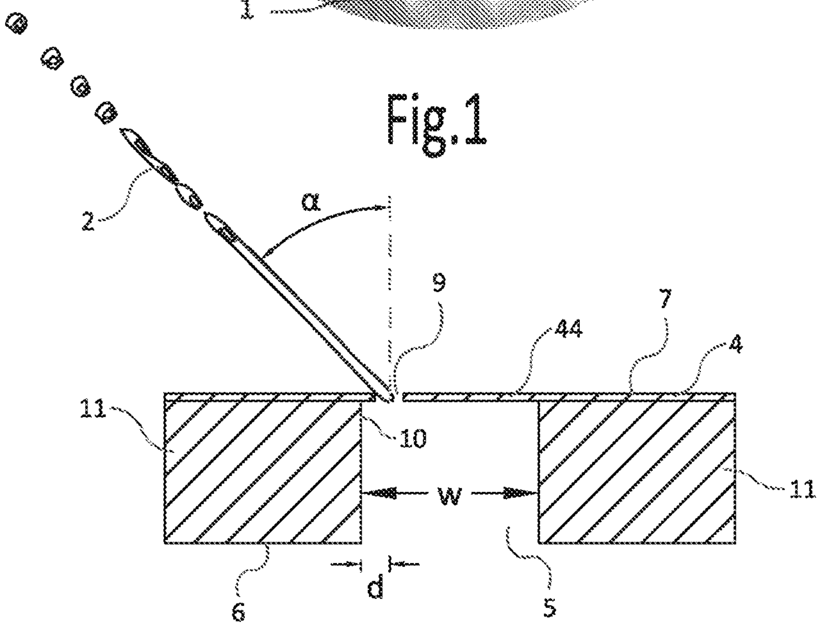
FIG. 2 is a cross-section of a first embodiment of a spray nozzle body of a spray nozzle as applied in the spray nozzle unit of FIG. 1.

It should be noticed that the figures are drawn schematically and not to scale. In particular, certain dimensions may be exaggerated to a higher or lesser extent in order to improve the overall intelligibility. Corresponding parts are denoted by a same reference sign throughout the drawing A first embodiment of a spray nozzle unit 1 and a cross section of the spray nozzle that is applied in said unit is shown in FIGS. 1 and 2. The spray nozzle and spray nozzle unit are intended for a spray device for spraying at least one fluidic microjet 2 at an inclined angle α relative to a centre line of a nozzle orifice. The spray nozzle comprises a substantially planar support body 11 made from silicon, glass, plastic or photosensitive polymer with a thickness of between 50 and 675 micrometer having at least one cavity 5 with a diameter w of typically 10-100 micrometer extending from a first main (downstream) surface 7 to a second main (upstream) surface 6 thereof. A thin membrane layer 4 made typically from a thin film ceramic material like (poly) silicon, silicon nitride, silicon oxide or silicon carbide forms a nozzle membrane that is suspended over the cavity 5 and that has at least one nozzle orifice 9 with diameter typically between 0.5 and 20 micrometer in fluid communication with said cavity. The cavity 5 and said nozzle orifice 9 form a geometrically defined asymmetric fluid flow resistance as said nozzle orifice 9 is positioned near an edge wall 10, i.e perimeter, of said cavity, in particular at a distance (d) less than one to three times the diameter of the nozzle orifice. This causes the microjet (2) to emit at an inclined angle (α) with respect to the substantial planar membrane layer (4). A centre of the cavity may be understood as a centre seen in the lateral direction, i.e. in a direction parallel to the downstream surface of the membrane layer.

Figure 3:
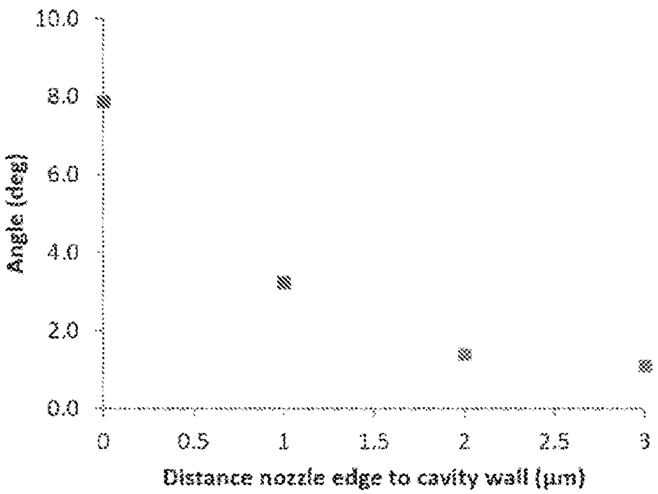
FIG. 3 shows the dependence between the inclination angle and the distance between the edge wall and the nozzle.

The orifice 9 is a-centrally positioned, i.e. it is positioned with an offset in respect of the centre of the cavity 5, seen along the downstream surface. The flow path towards said orifice also has an a-central, i.e. asymmetrical flow profile in terms of flow resistance. This results in a microjet 2 emanating from said orifice under an angle of deflection α relative to a centre line of said orifice. FIG. 3 depicts the dependence of the inclination angle α with respect to the distance d between the edge wall 10 and the edge of a nozzle 9 with a diameter of 4 micron in a cavity 5 having a diameter w of 40 micron (see FIG. 2). Shifting the nozzle more than 3 micron from the edge already gives a steep decrease of the inclination angle, from 8° to less than 2°.

Figure 4:
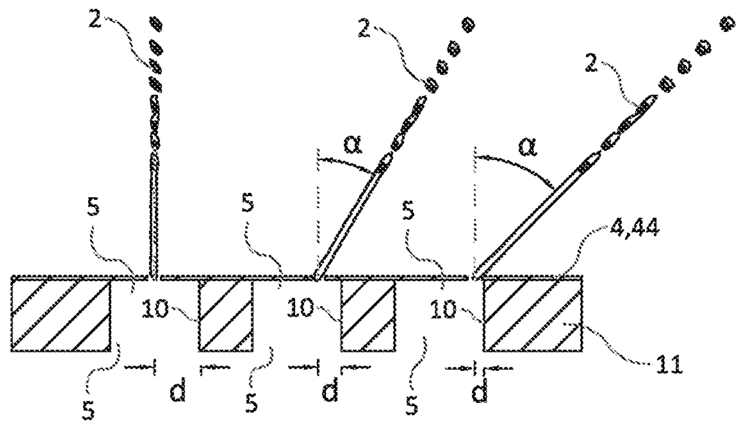
FIG. 4 is an embodiment of a spray nozzle with an array of cavities.

In FIG. 4 an embodiment of a spray nozzle with an array of cavities 5 each with a diameter of typically between 10 and 100 micrometer and a distance between adjacent cavities of 5 to 200 micrometer is shown enabling different inclination angles α of the microjets 2 that are dependent on the distance d of the orifices with respect to the edge walls 10 of the fluid cavities 5. Each orifice is provided with a different offset in respect of the corresponding cavity. As the offsets differ, the angles of ejection of the microjets also differ.

Membrane layers for spraying can be made with known micro machining techniques. A mono crystalline silicon wafer with thickness of typically between 100 and 675 micron is provided to form a membrane layer support body. Using Low Pressure Chemical Vapour Deposition a layer of low stress silicon nitride with a thickness of 0.5-1.5 micron is grown on said support body to form a membrane layer. With a suitable mask a photo lacquer pattern with 4.5 micron, typically between 0.5 and 20 micron, orifices at the front side of the wafer and a pattern with 40 micron, typically between 10 and 100 micron, diameter openings at the back side, that register i.e. correspond with said at least one opening at said front side, is being exposed and developed. With the aid of anisotropic reactive ion etching at least one opening with a diameter of 4.5 micron, typically between 0.5 and 20 micron, and a length of 1 micron, typically between 0.5 and 1.5 micron, is etched in the silicon nitride layer to create at least one nozzle orifice.

With the use of deep reactive ion etching a cavity with a diameter of 40 micron, typically between 10 and 100 micron, and a length of 200 micron, typically between 100 and 675 micron, is made in the silicon wafer, forming the support body. The membrane layer extending over the cavity and comprising said at least one orifice forms a nozzle membrane that is suspended over the cavity. A freely suspended, hanging nozzle membrane having a circular cross section with a diameter of 40 micron and being made of a 1 micron thick silicon rich silicon nitride layer, can easily withstand spray pressures of 100-150 bar.

Figure 5:
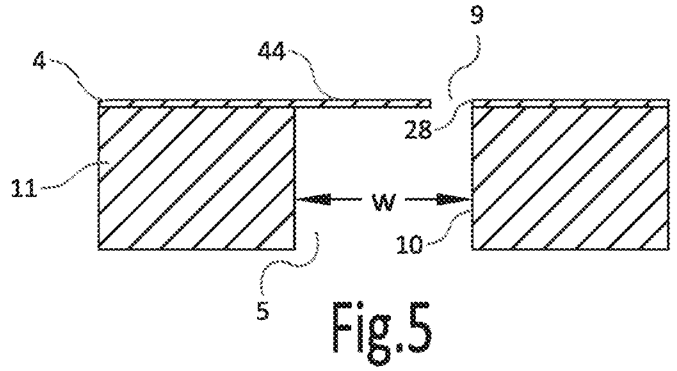
FIG. 5 is an embodiment of a spray nozzle with a nozzle orifice having a direct boundary with an edge wall.
Figure 6:
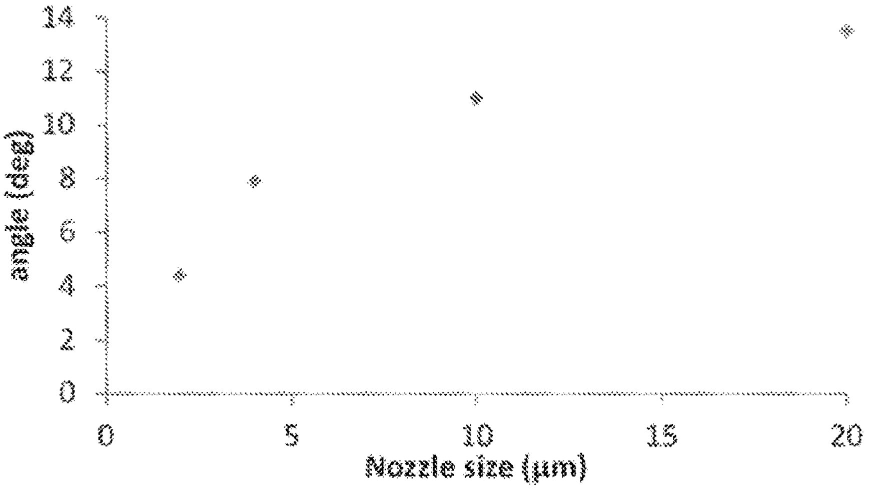
FIG. 6 shows the dependence between the inclination angle and the size of the nozzle orifice.

In FIG. 5 another embodiment of a spray nozzle with a nozzle orifice 9 having a direct boundary 28 with the edge wall 10 in a cylindrical cavity 5 with a diameter of 40 micron. The observed inclination angle is found to be dependent on the size of the nozzle orifice 9 as presented in FIG. 6. An inclination angle larger than 5° is found when the diameter of the nozzle orifice 9 is larger than 10% of the cavity diameter w. An inclination angle larger than 10° is found when the diameter of the nozzle orifice 9 is larger than 25% of the cavity diameter w.

Figure 7:
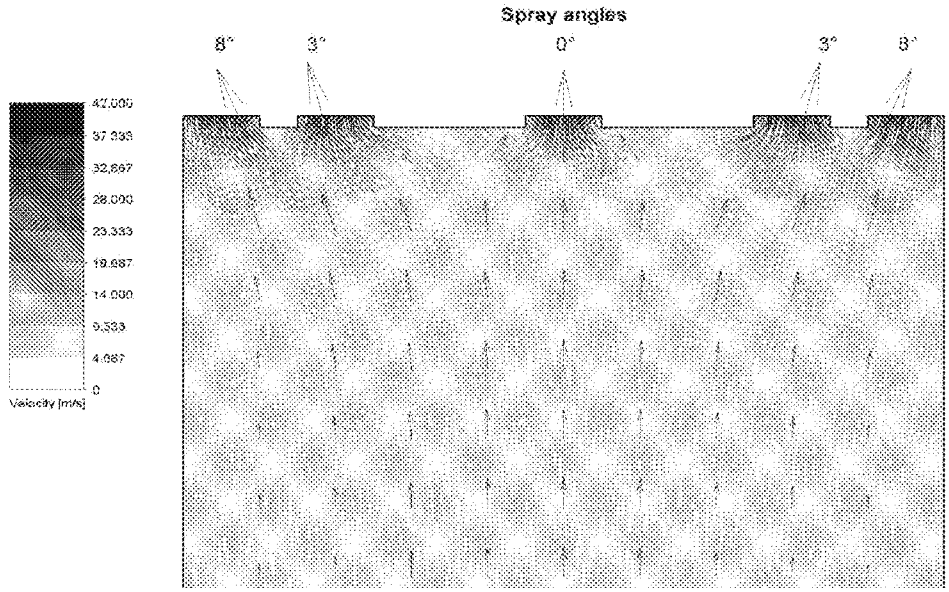
FIG. 7 represents a fluid simulation of a cylindrical cavity with a round membrane.

In FIG. 7 a fluid simulation is presented of a cylindrical cavity with a round membrane layer having a diameter of 40 micron and a thickness of 1 micron. In the membrane layer a number of nozzle orifices with a diameter of 4 micron have been placed showing different spray inclination angles depending on the offset and the distance to the edge wall and also depending on the relative position of adjacent nozzle orifices. In FIG. 7 a (virtual lateral and parallel to the membrane layer) channel with a height comparable with the diameter of the nozzle orifice can be discerned, enabling a lateral impulse contribution of the fluid that is passing through the nozzle orifice.

When the fluid is flowing parallel to the nozzle membrane just before it is jetted via the nozzle it will have a specific lateral impulse (mass density times lateral velocity) upon flowing through the nozzle orifice. When the fluid passes the nozzle it will also acquire a vertical impulse (mass density times vertical velocity) with respect to the membrane layer. When the membrane layer is relatively thin a major part of the lateral impulse will also be transferred to the jet emanating from the nozzle. The jet inclination angle will then be determined by the ratio of the transferred lateral and vertical impulse, typically the ratio should be larger than 0.1 and preferably larger than 0.2. The closer the orifice is positioned near the edge wall of the cavity the larger the residual lateral impulse of the microjet, and the more oblique is the angle of inclination. The lateral impulse is defined as the mean lateral impulse of the fluid near the nozzle exit, and to be more precise the lateral impulse as averaged over a virtual lateral channel with a channel height equal to the diameter of the nozzle orifice and having a boundary with the nozzle membrane, for cases in which the total height of the lateral channel is much larger than the diameter of the nozzle orifice.

It will be clear that with a single membrane layer membrane many different layouts are possible for the placement of the nozzle orifices on the nozzle membrane. With preference in a round membrane the orifices are angularly distributed and can comprise a first set of angular distributed nozzles adjacent to the cavity wall, a second set of angular distributed nozzles with a distance to the cavity wall of approximately two times the nozzle orifice diameter, and a further set of angular distributed nozzles more inwards to the membrane.

In optional cases when a large amount of nozzle orifices are needed, e.g. more than ten or twenty it is likewise possible to make more than one free hanging membrane in the nozzle support body (see also FIG. 4). Such free hanging membranes themselves can then be angularly distributed on the membrane layer, and the location of the orifices on each of the membranes can be chosen that a maximum amount of diverging jets can be obtained. Also in optional cases the cavity of the support body is ring shaped, and also the nozzle membrane that is suspended over the cavity is ring shaped. This is advantageous when a large number of orifices is needed for high throughput spraying at a large pressure. The pressure strength of the ring shaped membrane is strongly determined by the inner width of the ring, which can be chosen to be e.g. 40 micron whereas the total outer diameter of the ring can be several hundreds of microns.

Figure 8:
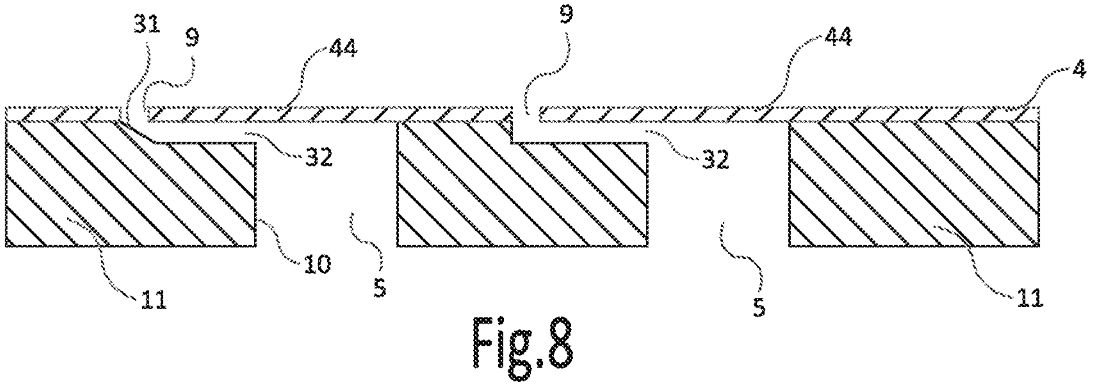
FIG. 8 is an embodiment of a spray nozzle with a fluidic channel directly underneath and parallel to the nozzle membrane.

In FIG. 8 another embodiment of a spray nozzle is depicted comprising a fluidic channel 32 directly underneath and parallel to the nozzle membrane (44) with a mean diameter between 0.3 to 3 times the mean diameter of the orifice and a length between 0.5 to 5 times the mean diameter of the orifice. The fluidic channel 32 enables a lateral impulse contribution of the fluid that is passing through the nozzle orifice. The entrance of the fluidic channel 32 has preferably a very sharp, well-defined edge of 70-100 degrees.

Figure 9:
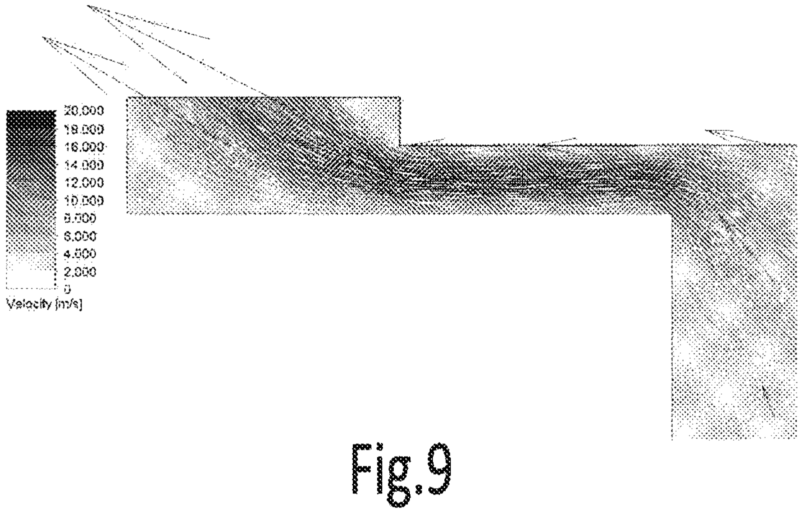
FIG. 9 is a fluid simulation showing a large angle of inclination of the emanating jet.

In FIG. 9 a fluid simulation is presented clearly showing that a large angle of inclination of the emanating jet is attainable with this measure according to the invention. Many embodiments are possible, such as choosing a cavity edge wall 10 that is positively tapering towards the nozzle orifice 9. It will be clear that many measures to increase the lateral impulse in combination with a thin nozzle membrane are possible to yield large inclination angles. Very large inclination angles ($\alpha$>10-20°) can thus be obtained when the lateral channel over a specific length beneath the nozzle membrane has a height comparable or smaller than the nozzle orifice diameter.

Figure 10:
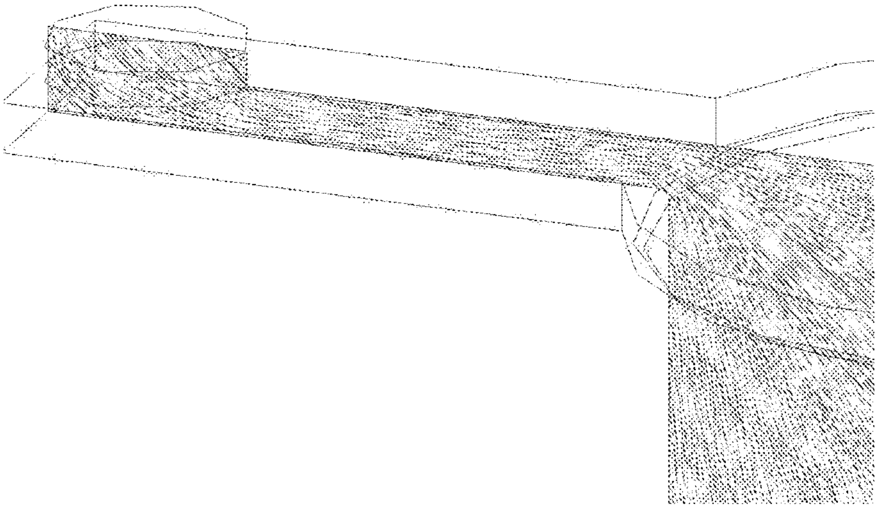
FIG. 10 is an embodiment in which a width of the lateral fluidic channel is relatively small and comparable to the nozzle orifice diameter.
Figure 11:
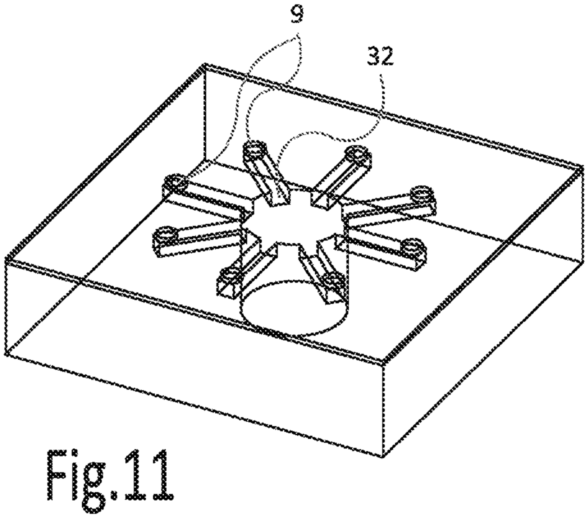
FIG. 11 is an embodiment having a number of angularly distributed nozzle orifices.

With preference the width of the lateral fluidic channel 32 is also chosen small and comparable to the nozzle orifice diameter, see FIG. 10. The smaller the lateral channel and the smaller the nozzle orifice length the larger the inclination angle is observed. For example a jet inclination angle of 37° has been obtained with a spray device having a nozzle orifice with a diameter of 4 micron, a length of 0.7 micron connected to a lateral fluidic channel with a height of 1 micron, a length of 8 micron and a width of 5 micron (FIG. 10). A number of angular distributed nozzle orifices 9 with such fluidic channels 32 is depicted in FIG. 11.

Figure 12:
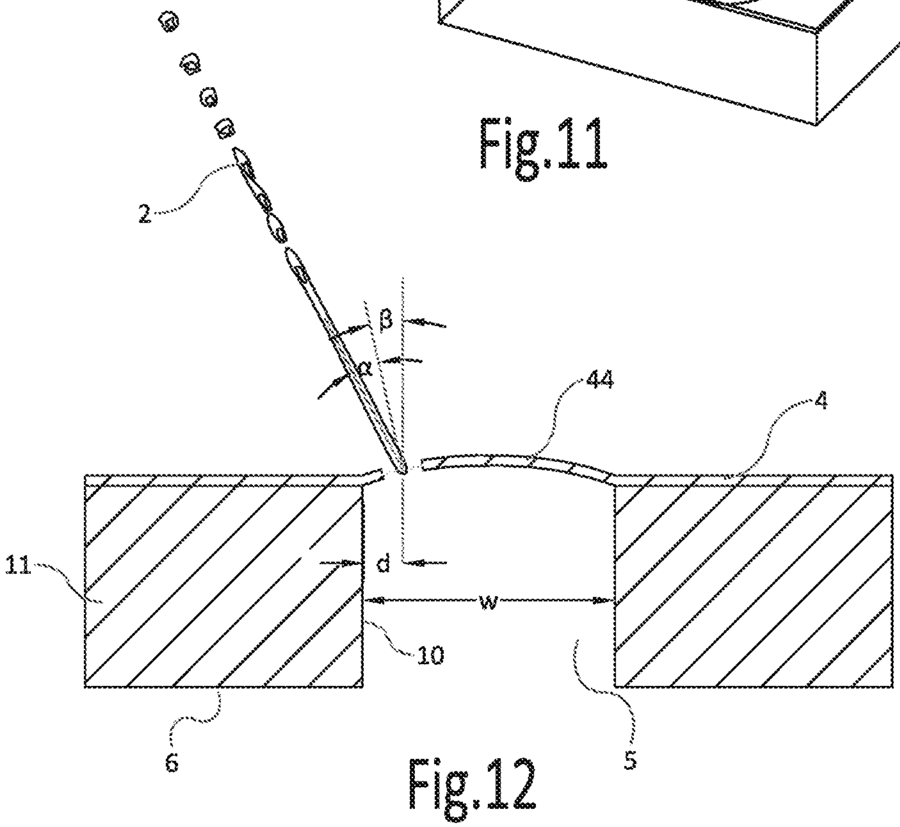
FIG. 12 shows the effect of a possible bending of the nozzle membrane.

The effect of a possible bending of the nozzle membrane is depicted in FIG. 12. As can be noticed bending over an angle $\beta$ adds to the inclination angle $\alpha$ of the jet to give a total deflection over an angle of $\alpha+\beta$.

In some cases it may be desirable to construct a nozzle orifice having a cross section plane at the second main surface substantially offset from the substantially flat membrane layer, especially in cases when a number of different angles of inclination are needed in one spray nozzle unit. Some nozzles can then be constructed according to one of the above said embodiments, and some according to the latter mentioned substantially offset condition.

Figure 13:
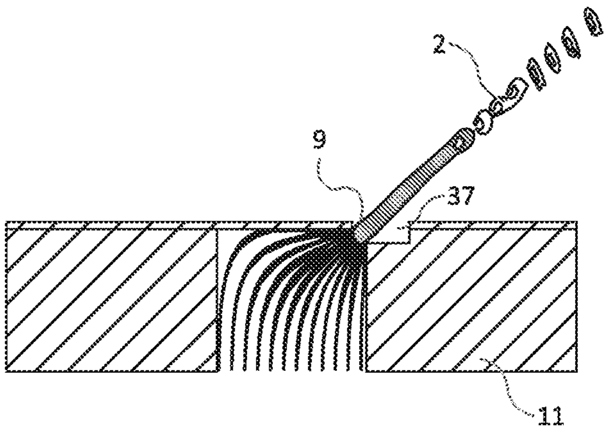
FIG. 13 is an embodiment having a nozzle orifice extending over the support body.

An embodiment (see FIG. 13) is characterized in that the nozzle orifice 9 extends over the support body 11, while the support body 11 is locally etched beneath said extension 37 of said nozzle orifice 9 to a depth between 0.3 to 3 times the mean diameter of the orifice creating an orifice for spraying at least one fluidic microjet 2 at an inclined angle.

Figure 14:
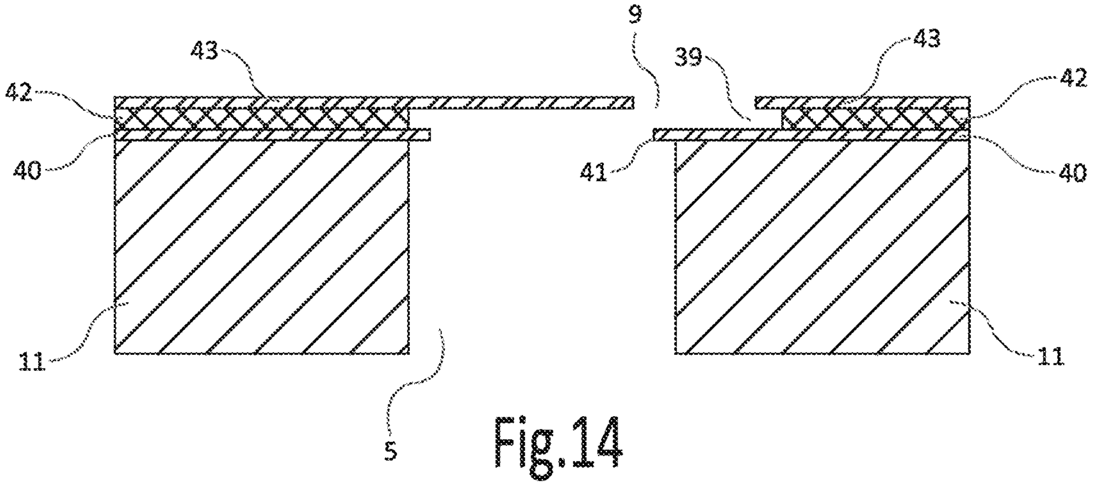
FIG. 14 shows a further embodiment of the nozzle according to the invention.

In a further embodiment (see FIG. 14) of the nozzle according to the invention the membrane layer comprises a multilayer sandwich of a first silicon nitride layer 40 with a thickness of typically 0.5-1.5 micrometer, a silicon oxide layer 42 with a thickness of typically 0.5-5 micrometer and a second silicon nitride layer 43 with a thickness of typically 0.5-5 micrometer. The membrane layer is provided with an orifice 9 that extends partly over the support body 11 and partly within the cavity 5 that is provided in said support body. The orifice 9 comprises a cavity 39 that is formed in said multilayer membrane layer with the first silicon nitride layer 40 having an extension 41 over the cavity 39 with diameter 10-100 micrometer and a length of 100-675 micrometer and with the cavity 39 extending through the first silicon nitride layer (40) with an opening diameter that is smaller than or equal to the cavity 39 diameter and the silicon oxide layer 42 and with a second silicon nitride layer 43, in which the orifice 9 with diameter of 0.5-20 micrometer is etched through extending in the silicon oxide layer 42.

Figure 15:
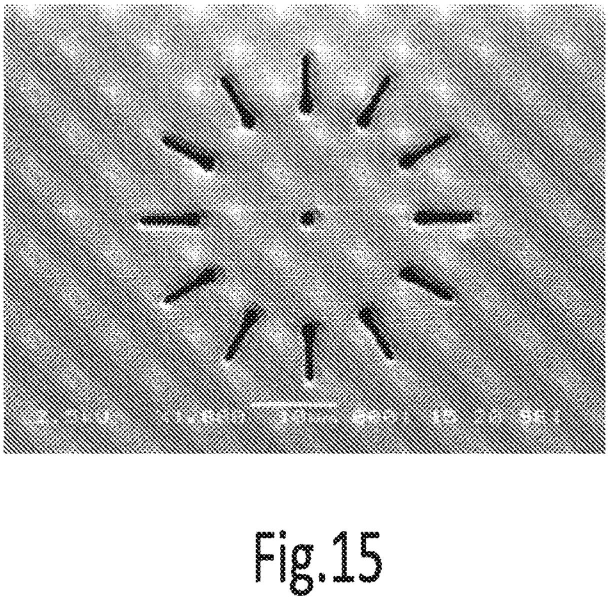
FIG. 15 shows a further embodiment of the nozzle according to the invention.

Another embodiment of a spray nozzle membrane forming itself a significant contribution to the lateral impulse of the emanating jet is depicted in FIG. 15. Here a geometrically asymmetric fluid flow resistance inside the nozzle membrane itself is created, such that the liquid flowing through the orifice near the edge wall of said cavity has a lower velocity than the liquid through the same orifice near the middle of the nozzle membrane, which enables to emit at a specific inclination angle with respect to the membrane layer. With preference a cross section of said nozzle orifice is oval, tear, moon, V or U shaped. Also is depicted in FIG. 15 a nozzle membrane that has one symmetrically shaped orifice in the middle of the nozzle membrane to allow jetting without any inclination.

Figure 16:
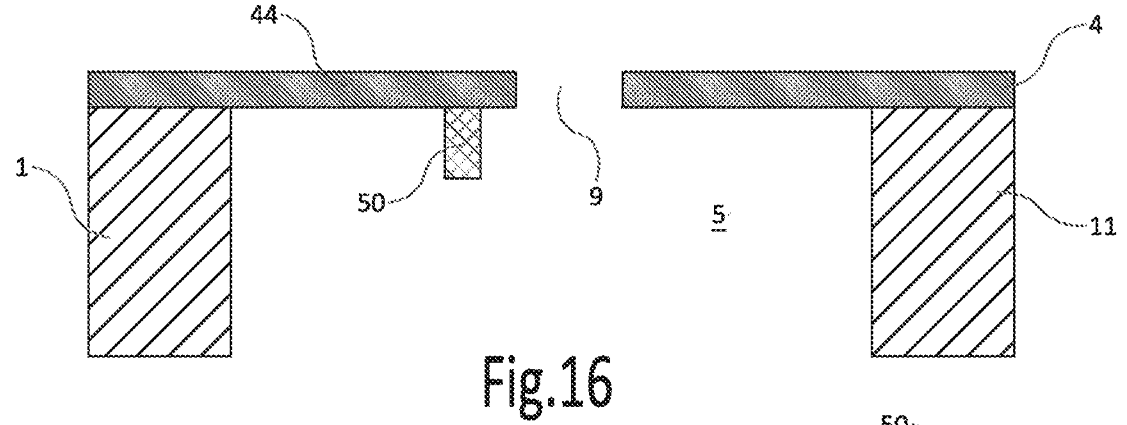
FIG. 16 shows a further embodiment of the nozzle according to the invention.

Another embodiment is shown in FIG. 16, adjacent to a nozzle orifice one or more protrusions or rim shaped barriers 50 are provided. The barrier typically has a rim height of between 1 and 10 micrometer, a rim length of typically the nozzle diameter and a width of typically 0.2-5 micrometer. Such a barriers appears to influence the flow profile and significantly change the impulse direction and deflection angle of the emanating jet.

Figure 17:
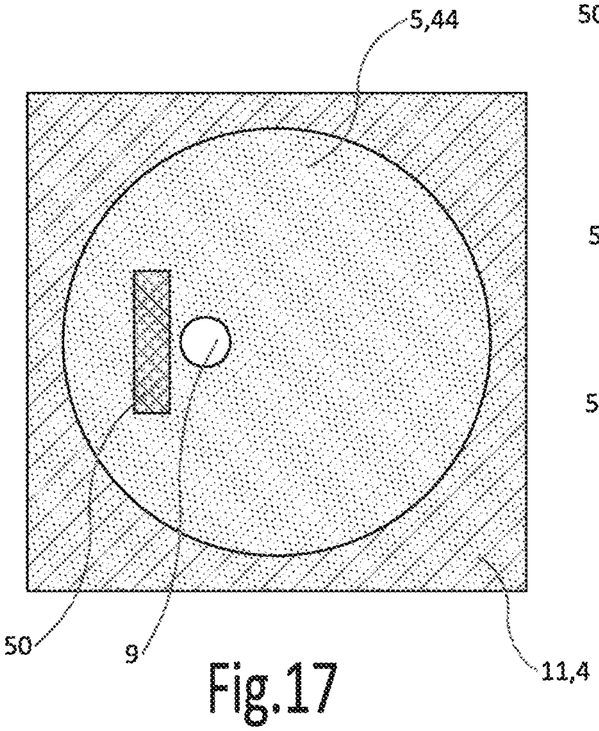
FIG. 17 shows a single rectangular protrusion or rim shaped barrier adjacent the nozzle orifice.
Figure 18:
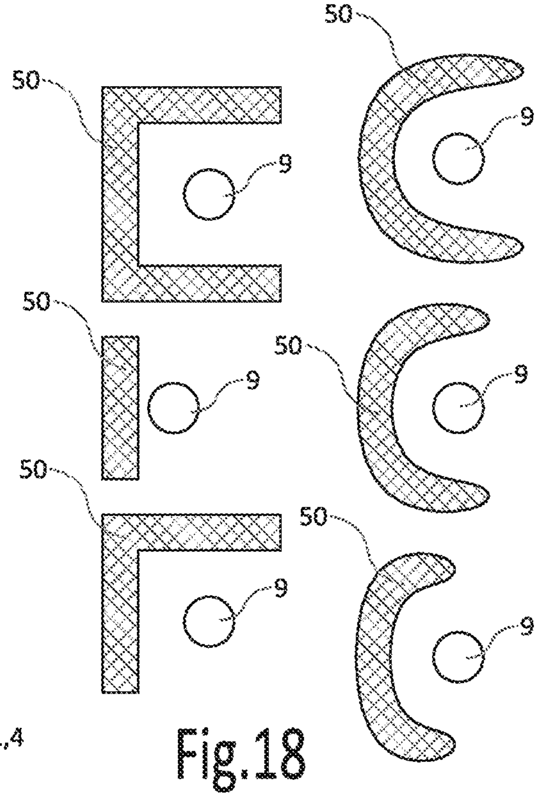
FIG. 18 alternative embodiments of the barrier shown in FIG. 17.

A single rectangular protrusion or rim shaped barrier may be present on one side of the nozzle orifice, as shown in FIG. 17, but more than one barrier may also be present at more sides adjacent the nozzle orifice. Examples of such embodiments are shown in FIG. 18. The barrier 50 may be rectangular but also shapes such as semi-circular that closely fits around a orifice 9 are possible (FIG. 18).

Figure 28:
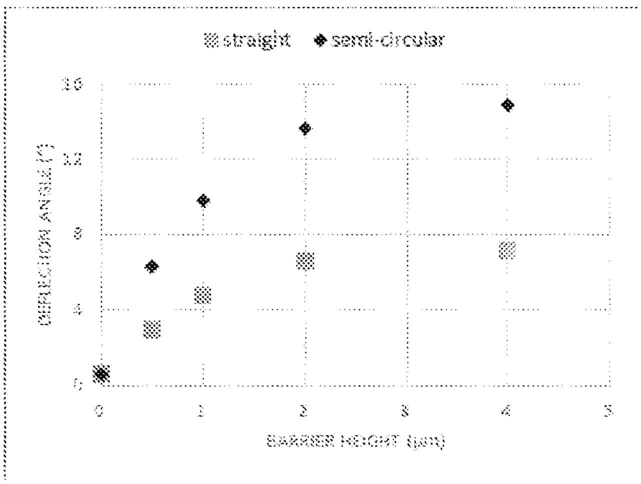
FIG. 28 is a graph showing that the deflection angle to be dependent on the height of a harrier and the shape of the barrier.

The length and the height of these protrusions or rim shaped barriers will influence the deflection angle of the jet. Some results showing the relation between the declination angle and these properties of the barrier, such as the shape and height, are shown in FIG. 28 for a nozzle membrane with a diameter of 50 μm, an orifice having a diameter 4.5 μm, and a rim shaped barrier with a varying shape and height placed at about 0.75 μm from the edge of the orifice. The fluid is water at a pressure of 7 bar with a flow rate of 1.33 ml/hr and the membrane has a thickness of 850 nanometer.

The deflection angle is proportional to the barrier height and levels of when the height becomes equal to the orifice diameter of, in this embodiment, 4.5 micron (cf. FIG. 28). Both the straight barrier and the semi-circular (180°) barrier are placed as closely as possible near or around the orifice edge. The deflection of a straight wall barrier is about half the deflection of a semi-circular barrier, if both barriers have equal height. The optimum barrier height is between 10% and 100% of the orifice diameter, in particular between 50% and 80% of the orifice diameter.

Figure 29:
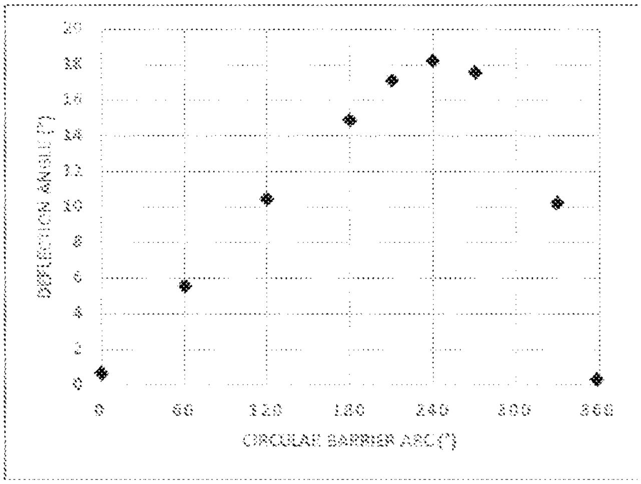
FIG. 29 is a graph showing that the deflection angle to be dependent on the extent of a circular harrier adjacent the orifice.

The deflection angle appears also proportional to the size of the circular arc of the barrier, as shown in FIG. 29. The height of the circular arc barrier is 4 μm and the barrier is placed at the edge of an orifice with a diameter of 4.5 μm. The deflection angle is optimum in a circular arc range of 120°-330°, or more particular between 180° and 260°.

Figure 30:
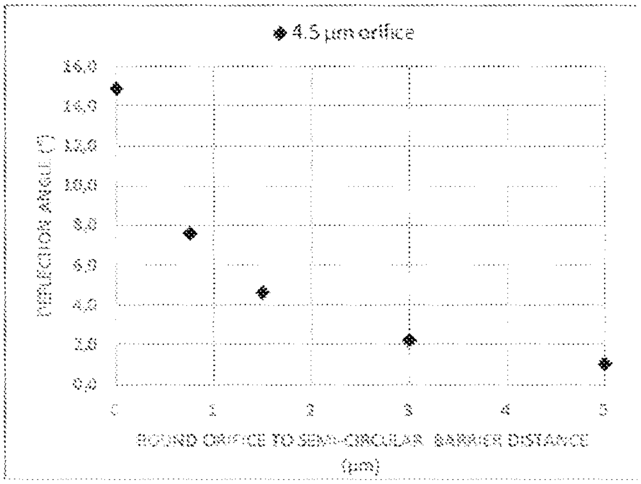
FIG. 30 is a graph showing that the deflection angle to be dependent or the distance between a barrier and the orifice.

The deflection angle decreases with increasing distance between the semi-circular barrier and the round shaped orifice, as shown in FIG. 30. For larger orifices the deflection angle decreases slower with increasing distance between the barrier and the orifice (with similar flow speeds). Preferably the distance between the orifice and the semi-circular barrier is less than 25% the orifice diameter, in particular less than 10% of the orifice diameter.

Figure 19:
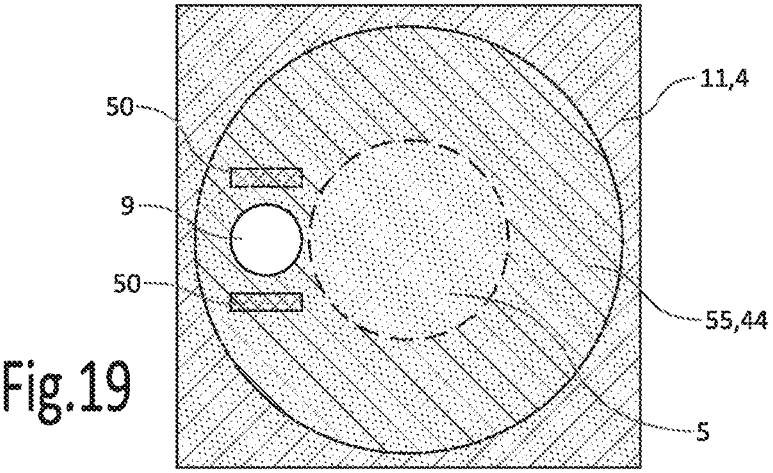
FIG. 19 shows a double rectangular protrusion or rim shaped barrier adjacent the nozzle orifice.

Another preferred embodiment is shown in FIG. 19, where the cavity 5 with a typical diameter of 10-90 micrometer is smaller than the nozzle membrane 44 with a typical diameter of 30-100 micrometer, leaving a recessed area 55 with a typical height ranging of 0.5-10 micrometer and a typical length of 0.5-20 micrometer at which the nozzle orifice 9 with a diameter 0.5-15 micrometer is placed at a position between the edge of the cavity 5 and the edge of the nozzle membrane and rim shaped barriers (50) are created at the recessed area 55 around the nozzle orifice to direct the liquid from the cavity and resulting in an inclined jet emanating from the nozzle orifice.

Figure 20:
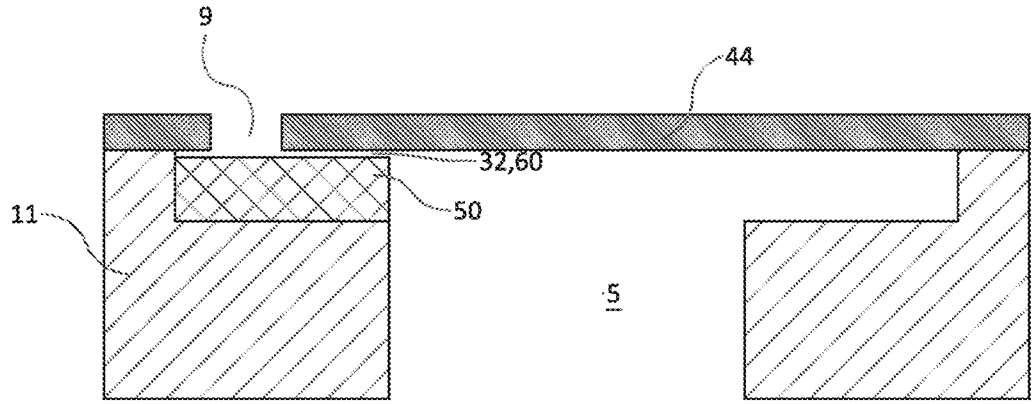
FIG. 20 shows a further embodiment of the nozzle according to the invention.
Figure 21:
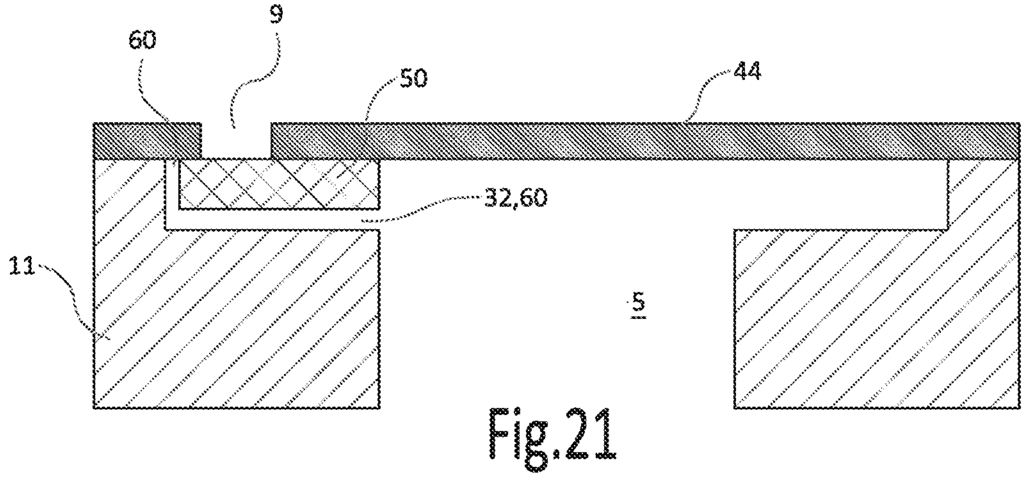
FIG. 21 shows a further embodiment of the nozzle according to the invention.

Rim shaped barriers may be fixed at the nozzle membrane as in the embodiment shown in FIGS. 16 and 21, leaving a gap 60 typically varying between 50 nanometre and 1.5 micron between the barrier 50 and nozzle support body 11. Such a barrier 50 may also be fixed at the support body 11 as shown in FIG. 20. The gap 60 decouples the nozzle membrane 44 from the support body 11 and greatly reduces stress points near these rim shaped barriers 50 to the nozzle membrane 44 resulting in a very high pressure strength of the nozzle membrane 44 such that the membrane typically can withstand pressures of 150-200 bars for a silicon nitride membrane with a diameter of 50 micron. In any case it is preferential to have a void free and obstacle free membrane edge that is circular shaped.

A preferred embodiment of a spray nozzle unit with rim shaped barriers may lead to jet deflection angles that are much larger than without the rim shaped barrier. Moreover the presence of rim shaped barriers leads to less pressure losses in the spray nozzle unit than for embodiments without rim shaped barriers for a given deflection angle.

Figure 22:
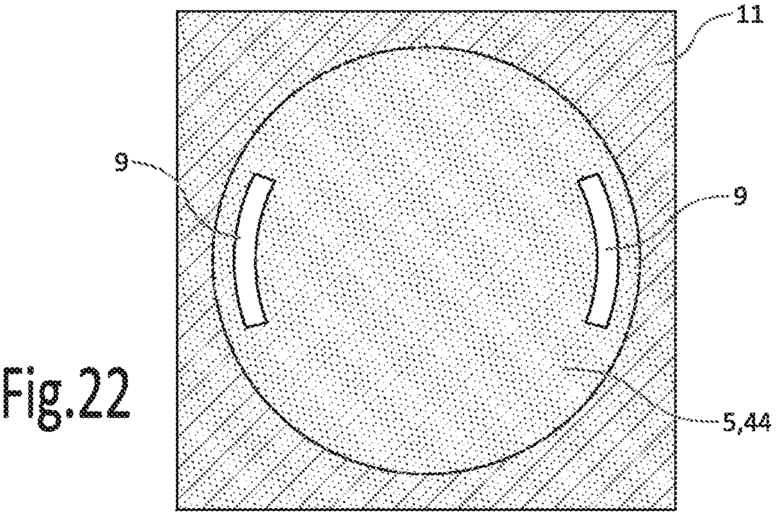
FIG. 22 shows non-circular orifices that are placed close to the wall of the cavity.
Figure 23:
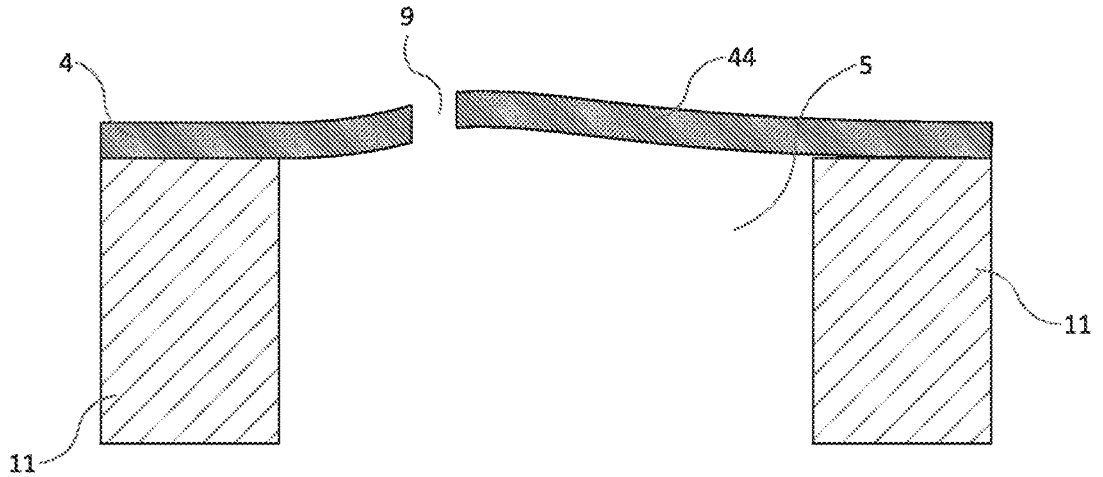
FIG. 23 shows local betiding of the membrane.

Another embodiment of a spray nozzle membrane is shown in FIG. 22 where a non-circular orifice is placed closely to the wall of the cavity. The long elongated orifice with a length at least twice the width of the orifice has a more asymmetrical flow pattern than a circular orifice with the same orifice surface area in case the orifices are placed with the same distance between the nozzle membrane edge and nozzle orifice edge, which is typically less than 3 times a diameter of the nozzle orifice, and thus the jet emanating from the elongated orifice has more inclination than the circular pore. A further advantage of long elongated orifices in a nozzle membrane is the fact that the local bending of the membrane is deviating from the normal bending curve of a membrane giving the emanating jet additional inclination, as shown in FIG. 23.

Figure 24:
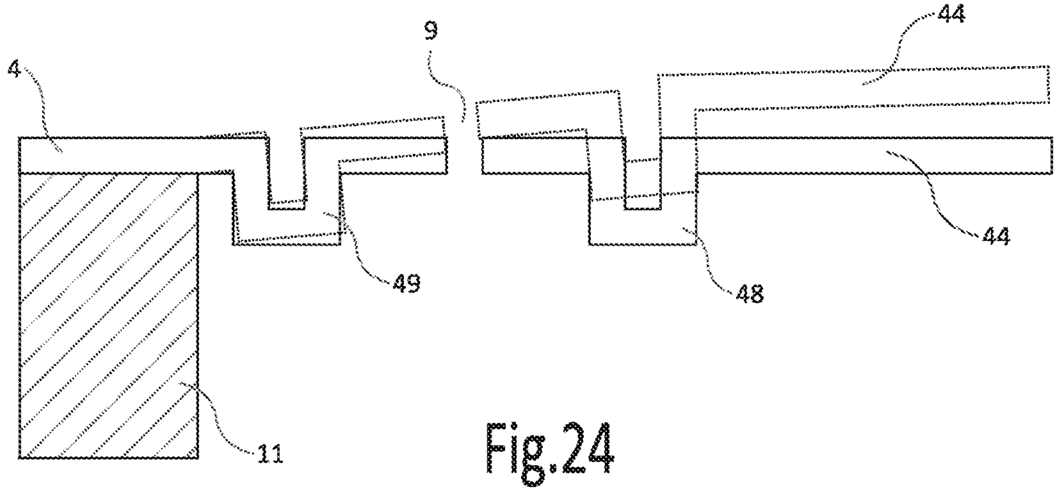
FIG. 24 shows a further embodiment of the nozzle according to the invention.

Another preferred embodiment of a spray nozzle membrane is shown in FIG. 24, where one or more nozzle orifices 9 are placed in between two adjacent corrugation zones 48, 49. The corrugation zones have a width of typically 2.5-5 micrometer and a height of typically 1-5 micrometer. The outer corrugation zone is placed on or near the edge 10 of the membrane 44 at a distance of typically 0-10 micrometer.

Figure 25:
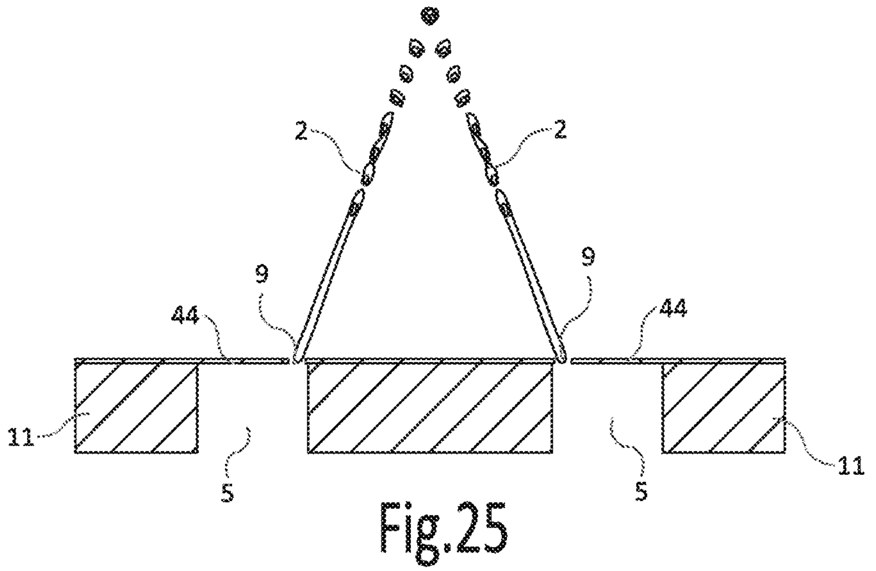
FIG. 25 is a special embodiment with two or more deflecting jets that collide.

A special embodiment of a nozzle according to the invention is shown in FIG. 25. In this embodiment two or more deflecting nozzle orifices 9 are positioned in such a way that two or more deflecting jets 2 will collide above the nozzle membrane 44 in a point or spot of intersection. If the velocity and kinetic energy of the jets is sufficiently high the collision of the jets will create droplets that are much smaller than the diameter of the nozzle orifice 9. This means that relatively large nozzle orifices 9 are allowed to generate a spray with a specific droplet size and size distribution. Larger nozzle orifices are less sensitive for clogging than smaller orifices.

Two or more deflecting jets that collide can also be obtained with two or more orifices in the same membrane through use of barriers as depicted in FIG. 16. It is also conceivable within the scope of the invention that two or more different liquids collide above the nozzle body. To that end the present embodiment may be provided with two or more separate cavities with separate means for supply of the subject liquids. This collision technology has many applications, especially in the field of collision of liquids with low stress materials, such as liquids containing bio-active material like peptides, vesicles and cells. Because the orifices can be made relatively large, whereas its depth relatively small, the passage of the vulnerable liquids are under mild low shear conditions. Applications are in fast 3D printing techniques, tissue engineering and similar applications.

Figure 26:
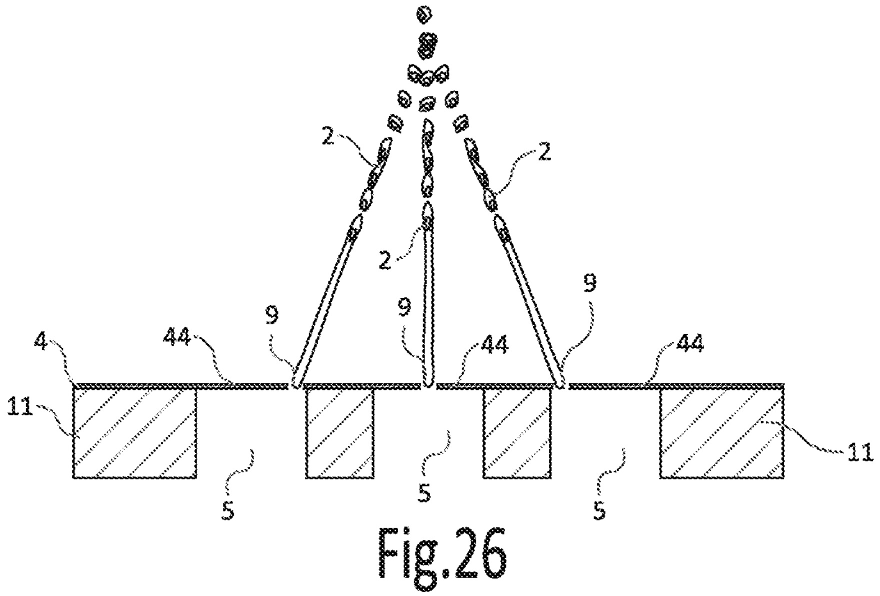
FIG. 26 is a preferred embodiment with two or more deflecting jets that collide.
Figure 27:
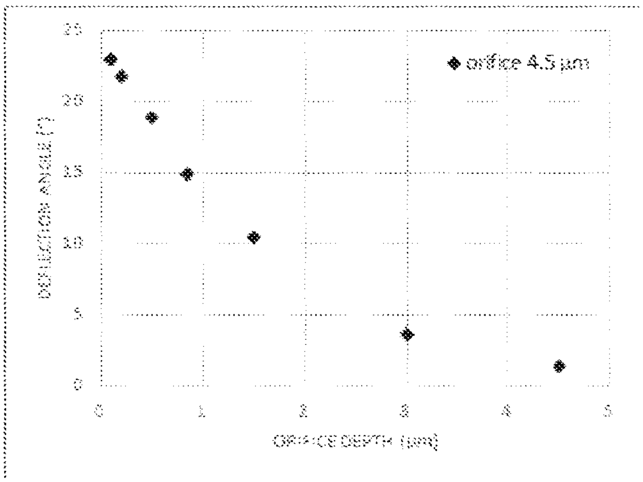
FIG. 27 is a graph showing that the deflection angle to be dependent on the thickness of the membrane.

FIG. 26 shows a preferred embodiment of the nozzle according to the invention having two or more deflecting nozzle orifices 9 that are positioned in such a way that they will release two or more deflecting jets 2 under a deflected angle such that they will collide above the nozzle membrane 44 in a point or spot of intersection. This embodiment further comprises a central nozzle orifice 9 that emanates a microjet 2 without deflection from a centre line of said orifice such that also this microjet 2 will cross the point or spot of intersection of the other microjets 2. This central microjet delivers a momentum at the point of intersection that is directed away from the main surface of the membrane thereby dragging the droplets with it. This counteracts droplets from being cast towards the membrane surface.

Another embodiment is characterized in that a first zone of said second main surface of said membrane layer which surrounds said nozzle orifice is at least partly hydrophobic. This nozzle orifice is self-cleaning.

Another embodiment is characterized in that the spray nozzle unit comprises at a main surface of said membrane layer an air diffusor, capable in reducing the vertical velocity of the jet exiting the nozzle orifice, wherein the air diffusor is conically or trumpet shaped with at least one air inlet opening at a height near the membrane layer.

Another embodiment is characterized in that the spray nozzle unit comprises at least one nozzle orifice with a perimeter slightly elevated above the surrounding surface of the membrane that enables jetting, in which said perimeter particularly has a height between 10% and 50% of a diameter of the nozzle orifice.

Another embodiment is characterized in that the spray nozzle unit is provided with filtration means which comprise a filtration plate which is in fluid communication with said cavity at said first main surface side of said membrane layer support body.

Although the invention has been described hereinbefore with reference to a number of certain embodiments, it will be understood that the invention is by no means restricted to these embodiments. Instead numerous embodiments and variations are feasible for a skilled person without departing from the scope and spirit of the invention.

Particularly the skilled person will appreciate that the following special embodiments emerge from the scope and spirit of the present invention:

Particular Embodiments of the Invention

1. A spray device, for spraying a fluidic microjet spray, comprising a spray nozzle unit, said spray nozzle unit comprising at least one spray nozzle having a chamber for receiving a pressurized fluid therein and having a perforated nozzle wall for releasing a microjet spray of said fluid, characterized in that said spray nozzle is formed by a nozzle body, comprising a support body with at least one cavity that opens at a main surface of said support body, said support body being covered by a membrane layer at said main surface and said membrane layer being provided with at least one nozzle orifice throughout a thickness of said membrane layer at an area of said cavity to form a nozzle membrane at each of said at least one cavity that is in fluid communication with the respective cavity, in that said at least one nozzle orifice comprises at least one deflecting nozzle orifice, releasing said microjet under a deflected angle that is directed away from an imaginary centre line of said orifice, and in that said at least one deflecting nozzle orifice is in open communication with a fluidic flow channel that has a lateral asymmetrical flowprofile in terms of a fluid flow resistance from said cavity towards said nozzle orifice.

2. Spray device according to embodiment 1, characterized in that said nozzle membrane comprises a central region at the area of said cavity and a peripheral region between said central region and an edge of said cavity, and in that at least one deflecting nozzle orifice is located within said peripheral region.

3. Spray device according to embodiment 1 or 2, characterized in that at least one deflecting nozzle orifice is positioned near a peripheral wall of said cavity, in particular at a distance between a centre of said deflecting nozzle orifice and said peripheral wall that is less titan three times a diameter of said nozzle orifice, and preferably less than said diameter of said nozzle orifice.

4. Spray device according to embodiment 1, 2 or 3, characterized in that said at least one deflecting nozzle orifice has a diameter larger than 10% of a diameter of said cavity and particularly has a diameter larger than 25% of the diameter of said cavity.

5. Spray device according to any of the preceding embodiments, characterized in that said cavity is configured to impose a lateral impulse on said fluid in said fluidic flow channel that is conveyed to the liquid while forming the microjet.

6. Spray device according to embodiment 5, characterized in that said said cavity comprises at least one relatively shallow lateral extension at said main surface, said membrane comprising at least one deflecting orifice at the area of said extension.

7. Spray device according to embodiment 6, characterized in that said extension generally has a width between 0.3 and 3 times a diameter of said deflecting orifice and a length between 0.5 and 5 times a diameter of said orifice.

8. Spray device according to embodiment 6 or 7, characterized in that said extension generally has a depth that is between 0.3 to 3 times a diameter of said orifice.

9. Spray device according to anyone of embodiment 6, 7 or 8, characterized in that said support body has been locally etched to form said at least one lateral extension of said cavity.

10. Spray device according to embodiment 6, 7 or 8, characterized in that said a least one lateral extension of said cavity comprises a substantially ring-shaped extension along a periphery of said cavity in fluid communication with a plurality of angularly distributed deflecting nozzle orifices.

11. Spray device according to embodiment 6, 7 or 8, characterized in that said a least one lateral extension of said cavity comprises a plurality of angularly distributed local extensions of said cavity, each being in fluid communication with at least one deflecting nozzle orifice.

12. A spray device according to any of the preceding embodiments, characterized in that said at least one deflecting orifice has a non-axi symmetrical shape having a wider part and a narrower part, particularly an oval, tear, moon, V or U shape, and in that said wider part of said nozzle orifice faces away from an edge wall of said cavity.

13. Spray device according to anyone of the preceding embodiments characterized by comprising at least one fluid barrier near said at least one deflecting orifice that is at least partly positioned in said fluidic flow channel towards said nozzle orifice, said at least one barrier being provided assymetrically with respect to said nozzle orifice.

14. Spray device according to embodiment 13, characterized in that said barrier comprises at least one rim that extends from said membrane to inside said flow channel.

15. Spray device according to embodiment 13 or 14, characterized in that said at least one barrier leaves a gap for fluidic passage of between 50 nanometer and 5 micrometer.

16. Spray device according to embodiment 13, 14 or 15, characterized in that said at least barrier is provide along a lineair, multi-linear or curvalinar contour around said deflecting nozzle, said contour being open at a side of said orifice that is directed to a centre of said cavity.

17. Spray device according to anyone of the preceding embodiments, characterized in that said cavity is generally ring-shaped, and in that said at least one deflecting nozzle orifice comprises groups of orifices that are distributed along an outer periphery of said generally ring-shaped cavity.

18. Spray device according to anyone of the preceding embodiments, characterized in that said spray nozzle is provided with filtration means which comprise a filtration plate that is in fluid communication with said cavity and that is provided onto an upstream surface of said support body.

19. Spray device according to anyone of the preceding embodiments, characterized in that said at least one deflecting nozzle orifice has a diameter of between 0.4 and 20 micron.

20. Spray device according to anyone of the preceding embodiments, characterized in that air difussor means are provided downstream of said nozzle, said air diffusor means being onfigured to reduce a velocity of the fluidic microjet that emanates from said nozzle, wherein said air diffusor means are conically or trumpet shaped and comprise at least one air inlet opening.

21. Spray device according to anyone of the preceding embodiments, wherein the liquid is a cosmetic liquid or a wafer cleaning liquid, characterized in that said spray nozzle has a microjet divergence angle greater than 10°.

22. Spray device according to any of the preceding embodiments, characterized in that said cavity has a generally circular or polygonal cross-section at said main surface and in that said at least one deflecting nozzle orifice comprises a set of a number of deflecting nozzle orifices that are angularly distributed along at least a part of a peripheral edge of said cavity, in particular at a distance from said edge that is less than a diameter of an orific.

23. Spray device according to embodiment 22, characterized in that at least one further set of deflecting spray nozzele orifices is angularly distributed along at least a part of said peripheral edge of said cavity, particularly at a distance from said edge that is between one and three times said diameter of an orific.

24. Spray according to anyone of the preceding embodiments, characterized in that said nozzle membrane is configured to bend during operation from a substantially flat initial state to an at least partly curved profile under pressure while releasing said microjet spray, and in that said at least one nozzle orifice is located near a point of inflection in said curved profile of said nozzle membrane.

25. Spray device according to embodiment 24, characterized in that said nozzle membrane is configured to bend in that said membrane is corrugated, comprising at least one corrugation along a periphery of said cavity.

26. Spray device according to embodiment 25, characterized in that said membrane comprises at least two laterally spaced corrugations along the periphery of said cavity and in that said at least one deflecting orifice is positioned in between adjacent corrugations.

27. Spray device according to embodiment 24, characterized in that said nozzle membrane is configured to bend in that said membrane is provided with at least one deflecting nozzle orifice that is elongated and allows said membrane to deflect along an edge of said elongated nozzle orifice.

28. Spray device according to anyone of the preceding embodiments, characterized in that a bare surface of said spray nozzle is hydrophobic at least at an area adjacent said at least one nozzle orifice.

29. Spray device according to anyone of the preceding embodiments, characterized in that said support body comprises a plurality of cavities that are distributed at said main surface, particularly distributed angularly at said surface, each one of said cavities being spanned by a nozzle membrane having at least one deflecting nozzle orifice.

30. Spray device according to anyone of the preceding embodiments, characterized in that said support body comprises a semiconductor body, preferably a silicon body.

31. Spray device according to anyone of the preceding embodiments, characterized in that said membrane layer comprises a ceramic layer, particularly of a thickness that is generally less than 2 microns, more particularly a silicon nitride layer.

32. Spray device according to anyone of the preceding embodiments, characterized in that said deflecting orifice extends partly beyond an edge of said cavity and partly over said cavity.

33. Spray device according to anyone of the preceding embodiments, characterized by further comprising a liquid supply system for supplying a pressurized liquid to said cavity of at least one spray nozzle.

34. Spray device according to anyone of the preceding embodiments, characterized in that said membrane has a thickness less that 50% of a diameter of said orifice, particularly less that 25% of said diameter.

35. Spray device according to embodiment 16, characterized in that said at least one barrier surrounds said orifice substantially along a semi-circular arc that subscribes an angle of between 120 and 330 degrees, particularly of between 180 and 260 degrees, around said orifice.

36. Spray device according to embodiment 16, characterized in that said barrier is spaced from said orifice over a distance that is less than 25% a diameter of said orifice, particularly less than 10% of said diameter of said orifice.

37. Spray device according to anyone of the preceding embodiments, characterized in that the spray nozzle unit comprises at least one nozzle orifice with a perimeter slightly elevated above the surrounding surface of the membrane that enables jetting, in which said perimeter particularly has a height between 10% and 50% of a diameter of the nozzle orifice.

38. Spray device according to anyone of the preceding embodiments, characterized in that said membrane comprises at least two deflecting nozzle orifices, releasing said microjet under a deflected angle along a jet line that is directed away from an imaginary centre line of the respective orifice, and in that the jet lines of said at least two nozzle orifices intersect one another to cause said emanating microjets to collide during operation.

39. Spray device according to embodiment 38, characterized in that said membrane comprises at least one third nozzle orifice, releasing said microjet under a substantially non-deflected angle along a jet line that is directed along an imaginary centre line of said third orifice, and in that the jet lines of said at least two nozzle orifices intersect with said jet line of said third orifice to cause said emanating microjets to collide during operation.

40. Spray device according to any of the preceding embodiments, characterized in that micro-valve means are present upstream of said defelcting nozzle orifice, said valve means comprising a micro-valve disc in close proximity of a micro-valve seat, said micro-valve disc resting on said micro-valve seat in a normally closed state and lifting from said seat once an upstream pressure threshold is exceeded to open a fluid passage between said micro-valve disc and said micro-valve seat towards said fluidic flow channel.

41. Spray device according to embodiment 40, characterized in that said nozzle membrane constitutes one of said micro-valve seat and said micro-valve disc.

42. Spray device according to anyone of the preceding embodiments, characterized in that said membrane comprises at least two deflecting nozzle orifices, releasing said microjet under a deflected angle along a jet line that is directed away from an imaginary centre line of the respective orifice, and in that said at least two nozzle orifices have a mutually different lateral cross section.

43. Spray device according to embodiment 42, characterized in that said membrane comprises at least two groups of deflecting nozzle orifices, releasing said microjet under a common deflected angle along a jet line that is directed away from an imaginary centre line of the respective orifice, and in that the orifices within each of said at least two groups of nozzle orifices feature a substantially identical lateral cross section that is distinct from a lateral cross section of the orifices in the other of said at least two groups of deflecting nozzle orifices.

44. Spray device according to anyone of the preceding embodiments, characterized in that at least one of said deflecting orifices has a triangular lateral cross-section.

45. Spray nozzle body of the type as applied in the spray device according to anyone of the preceding embodiments.

The invention claimed is:

1. A spray device, for spraying a liquid microjet spray, comprising a spray nozzle unit, said spray nozzle unit comprising at least one spray nozzle having a chamber for receiving a pressurized liquid therein and having a perforated nozzle wall for releasing a microjet spray of said liquid, wherein said spray nozzle is formed by a nozzle body, comprising a support body with a cavity that opens at a main surface of said support body, said support body being covered by a membrane layer at said main surface and said membrane layer being provided with at least one nozzle orifice throughout a thickness of said membrane layer at an area of said cavity to form a nozzle membrane that is in liquid communication with said cavity wherein said at least one nozzle orifice comprises at least one deflecting nozzle orifice, releasing said microjet under a deflected angle along a jet line that is directed away from an imaginary transverse center line of said deflecting nozzle orifice, and wherein said deflecting nozzle orifice is in open communication with a liquid flow channel that has a lateral asymmetrical flow profile in terms of a liquid flow resistance from said cavity towards said nozzle orifice.

2. The spray device according to claim 1, wherein said deflecting nozzle orifice has a diameter that is larger than twice a thickness of the membrane.

3. The spray according to claim 1, wherein said nozzle membrane comprises a central region at the area of said cavity and a peripheral region between said central region and an edge of said cavity, and wherein said deflecting nozzle orifice is located within said peripheral region.

4. The spray device according to claim 1, wherein said deflecting nozzle orifice is positioned adjacent to a peripheral wall of said cavity at a distance between a center of said deflecting nozzle orifice and said peripheral wall that is less than three times a diameter of said deflecting nozzle orifice.

5. The spray device according to claim 1, wherein said deflecting nozzle orifice has a diameter larger than 10% of a diameter of said cavity.

6. The spray device according to claim 1, wherein said cavity is configured to impose a lateral impulse on said liquid in said liquid flow channel that is conveyed to the liquid while forming the microjet.

7. The spray device according to claim 6, wherein said cavity comprises at least one lateral extension at said main surface that is shallower than said cavity, said membrane comprising said deflecting nozzle orifice at the area of said extension.

8. The spray device according to claim 7, wherein said extension has a width between 0.3 and 3 times a diameter of said deflecting nozzle orifice and a length between 0.5 and 5 times a diameter of said deflecting nozzle orifice.

9. The spray device according to claim 7, wherein said extension has a depth that is between 0.3 to 3 times a diameter of said deflecting nozzle orifice.

10. The spray device according to claim 7, wherein said support body has been etched to form said at least one lateral extension of said cavity.

11. The spray device according to claim 7, wherein said deflecting nozzle orifice comprises a plurality of angularly distributed deflecting nozzle orifices, wherein said at least one lateral extension of said cavity comprises a ring-shaped extension along a periphery of said cavity, and wherein said ring-shaped extension is in liquid communication with said plurality of angularly distributed deflecting nozzle orifices.

12. The spray device according to claim 7, wherein said at least one lateral extension of said cavity comprises a plurality of angularly distributed local extensions of said cavity, each being in liquid communication with at least one deflecting nozzle orifice of said plurality of angularly distributed deflecting nozzle orifices.

13. The spray device according to claim 1, wherein said deflecting orifice has a non-axi symmetrical shape having a wider part and a narrower part, and wherein said wider part of said deflecting nozzle orifice faces away from an edge wall of said cavity.

14. The spray device according to claim 1, comprising at least one liquid barrier that is at least partly positioned in said liquid flow channel towards said nozzle orifice, said at least one barrier being provided asymmetrically with respect to said nozzle orifice.

15. The spray device according to claim 14, wherein said barrier comprises at least one rim that extends from said membrane to inside said flow channel.

16. The spray device according to claim 14, wherein said at least one barrier leaves a gap for liquid passage of between 50 nanometers and 5 micrometers.

17. The spray device according to claim 14, wherein said at least one barrier is provided along a linear, multi-linear or curvilinear contour around said deflecting nozzle orifice, said contour being open at a side of said orifice that is directed to a center of said cavity.

18. The spray device according to claim 1, wherein said cavity is ring-shaped, and wherein said deflecting nozzle orifice comprises groups of orifices that are distributed along an outer periphery of said ring-shaped cavity.

19. The spray device according to claim 1, wherein said spray nozzle is provided with filtration means which comprise a filtration plate that is in liquid communication with said cavity and that is provided onto an upstream surface of said support body.

20. The spray device according to claim 1, wherein said deflecting nozzle orifice has a diameter of between 0.4 and 20 microns.

21. The spray device according to claim 1, wherein air diffusor means are provided downstream of said nozzle, said air diffusor means being configured to reduce a velocity of the liquid microjet that emanates from said nozzle, wherein said air diffusor means are conically or trumpet shaped and comprise at least one air inlet opening.

22. The spray device according to claim 1, wherein the liquid is a cosmetic liquid or a wafer cleaning liquid, wherein said spray nozzle has a microjet divergence angle greater than 10°.

23. The spray device according to claim 1, wherein said cavity has a circular or polygonal cross-section at said main surface, and wherein said at least one deflecting nozzle orifice comprises a set of a number of deflecting nozzle orifices that are angularly distributed along at least a part of a peripheral edge of said cavity.

24. The spray device according to claim 23, wherein at least one further set of deflecting spray nozzle orifices is angularly distributed along at least a part of said peripheral edge of said cavity.

25. The spray device according to claim 1, wherein said nozzle membrane is configured to bend during operation from a substantially flat initial state to an at least partly more curved profile under pressure while releasing said microjet spray, and wherein said at least one nozzle orifice is located adjacent to a point of inflection in said more curved profile of said nozzle membrane.

26. The spray device according to claim 25, wherein said nozzle membrane is configured to bend in that said membrane is corrugated, comprising at least one corrugation along a periphery of said cavity.

27. The spray device according to claim 26, wherein said membrane comprises at least two laterally spaced corrugations along the periphery of said cavity, and wherein said deflecting nozzle orifice is positioned in between adjacent corrugations.

28. The spray device according to claim 25, wherein said nozzle membrane is configured to bend in that said membrane is provided with at least one deflecting nozzle orifice that is elongated and allows said membrane to deflect along an edge of said elongated nozzle orifice.

29. The spray device according to claim 1, wherein an exposed surface of said spray nozzle is hydrophobic at least at an area adjacent to said at least one nozzle orifice.

30. The spray device according to claim 1, wherein said support body comprises a plurality of cavities that are distributed at said main surface.

31. The spray device according to claim 1, wherein said support body comprises a semiconductor body.

32. The spray device according to claim 1, wherein said membrane layer comprises a ceramic layer.

33. The spray device according to claim 1, wherein said deflecting nozzle orifice extends partly beyond an edge of said cavity and partly over said cavity.

34. The spray device according to claim 1, further comprising a liquid supply system for supplying a pressurized liquid to said cavity of at least one spray nozzle.

35. The spray device according to claim 16, wherein said at least one barrier surrounds said deflecting nozzle orifice substantially along a semi-circular arc that subscribes an angle of between 120 and 330 degrees around said deflecting nozzle orifice.

36. The spray device according to claim 16, wherein said barrier is spaced from said deflecting nozzle orifice over a distance that is less than 25% a diameter of said deflecting nozzle orifice.

37. The spray device according to claim 1, wherein said at least one nozzle orifice comprises at least one orifice that has a perimeter elevated above the surrounding surface of the membrane that enables jetting.

38. The spray device according to claim 1, wherein said at least one deflecting nozzle orifice comprises at least two deflecting nozzle orifices, releasing said microjet under a deflected angle along a jet line that is directed away from an imaginary transverse center line of the respective orifice, and wherein the jet lines of said at least two deflecting nozzle orifices intersect one another to cause said emanating microjets to collide during operation.

39. The spray device according to claim 38, wherein said membrane comprises at least one third deflecting nozzle orifice, releasing said microjet under a non-deflected angle along a jet line that is directed along an imaginary transverse center line of said third deflecting nozzle orifice, and wherein the jet lines of said at least two nozzle orifices intersect with said jet line of said third deflecting nozzle orifice to cause said emanating microjets to collide during operation.

40. The spray device according to claim 1, wherein micro-valve means are present upstream of said deflecting nozzle orifice, said micro-valve means comprising a micro-valve disc in close proximity of a micro-valve seat, said micro-valve disc resting on said micro-valve seat in a normally closed state and lifting from said seat once an upstream pressure threshold is exceeded to open a liquid passage between said micro-valve disc and said micro-valve seat towards said liquid flow channel.

41. The spray device according to claim 40, wherein said nozzle membrane constitutes one of said micro-valve seat and said micro-valve disc.

42. The spray device according to claim 1, wherein said at least one deflecting nozzle orifice comprises at least two deflecting nozzle orifices, releasing said microjet under a deflected angle along a jet line that is directed away from an imaginary transverse center line of the respective deflecting nozzle orifice, and wherein said at least two deflecting nozzle orifices have a different lateral cross section.

43. The spray device according to claim 42, wherein said at least one deflecting nozzle orifice comprises at least two groups of deflecting nozzle orifices, each one releasing a microjet under a common deflected angle along a jet line that is directed away from an imaginary transverse center line of the respective deflecting nozzle orifice, and wherein the deflecting nozzle orifices within each of said at least two groups of deflecting nozzle orifices feature a common lateral cross section that is distinct from a common lateral cross section of the orifices in the other of said at least two groups of deflecting nozzle orifices.

44. The spray device according to claim 1, wherein said deflecting orifice has a triangular lateral cross-section.

45. The nozzle body as applied in the spray device according to claim 1.

46. The spray device according to claim 5, wherein said deflecting nozzle orifice has a diameter larger than 25% of the diameter of said cavity.

47. The spray device according to claim 13, wherein said deflecting orifice has an oval, tear, moon, V or U shape.

48. The spray device according to claim 31, wherein said support body comprises a silicon body.

49. The spray device according to claim 32, wherein said membrane layer comprises a ceramic layer having a thickness that is less than 2 microns.

50. The spray device according to claim 49, wherein said membrane layer comprises a silicon nitride layer.

51. The spray device according to claim 32, wherein said membrane layer comprises a silicon nitride layer.

52. The spray device according to claim 35, wherein said at least one barrier surrounds said deflecting nozzle orifice substantially along a semi-circular arc that subscribes an angle of between 180 and 260 degrees around said deflecting nozzle orifice.

53. The spray device according to claim 36, wherein said barrier is spaced from said deflecting nozzle orifice over a distance that is less than 10% a diameter of said deflecting nozzle orifice.

54. The spray device according to claim 37, wherein said perimeter has a height between 10% and 50% of a diameter of the nozzle orifice.

55. The spray device according to claim 4, wherein said deflecting nozzle orifice is positioned adjacent to a peripheral wall of said cavity at a distance between a center of said deflecting nozzle orifice and said peripheral wall that is less than a diameter of said deflecting nozzle orifice.

56. The spray device according to claim 1, wherein said deflecting nozzle orifice has a diameter that is larger than four times the thickness of the membrane.

57. The spray device according to claim 23, wherein at least one further set of deflecting nozzle orifices is angularly distributed along at least a part of said peripheral edge of said cavity at a distance from said edge that is between one and three times said diameter of said deflecting nozzle orifice.

58. The spray device according to claim 1, wherein said support body comprises a plurality of cavities that are distributed angularly at said main surface, each one of said cavities being spanned by a nozzle membrane having at least one deflecting nozzle orifice.

59. The spray device according to claim 1, wherein said cavity has a circular or polygonal cross-section at said main surface, and wherein said at least one deflecting nozzle orifice comprises a set of a number of deflecting nozzle orifices that are angularly distributed along at least a part of a peripheral edge of said cavity at a distance from said edge that is less than a diameter of an orifice.

60. A spray device, for spraying a liquid, comprising a spray nozzle unit, said spray nozzle unit comprising at least one spray nozzle having a chamber for receiving a pressurized liquid therein and having a perforated nozzle wall for releasing a microjet spray that is composed of a plurality of microjets of said liquid, wherein said spray nozzle is formed by a nozzle body, comprising a support body with a cavity that opens at a main surface of said support body, said support body being covered by a substantially planar membrane layer at said main surface and said membrane layer being provided with a plurality of nozzle orifices throughout a thickness of said membrane layer at an area of said cavity to form a nozzle membrane that is in liquid communication with said cavity, wherein said nozzle orifices each release a microjet of said plurality of microjets, wherein said plurality of nozzle orifices comprises at least one deflecting nozzle orifice, releasing a respective microjet of said plurality of microjets under a deflected angle along a jet line that is directed away from an imaginary center line of said at least one deflecting nozzle orifice, said center line extending transverse to said substantially planar membrane layer, and wherein said at least one deflecting nozzle orifice is in open communication with a liquid flow channel that has a lateral asymmetrical flow profile in terms of a liquid flow resistance from said cavity towards said nozzle orifice.

* * * * *